United States Patent
Yoshida

(12) 
(10) Patent No.: US 8,314,948 B2
(45) Date of Patent: Nov. 20, 2012

(54) IMAGE FORMING SYSTEM UTILIZING NETWORK CAMERA

(75) Inventor: Toru Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1085 days.

(21) Appl. No.: 12/243,518

(22) Filed: Oct. 1, 2008

(65) Prior Publication Data

US 2009/0091775 A1    Apr. 9, 2009

(30) Foreign Application Priority Data

Oct. 3, 2007    (JP) .................... 2007-260051

(51) Int. Cl.
*G06K 1/00* (2006.01)
(52) U.S. Cl. ....... 358/1.13; 358/1.15; 382/115; 382/118
(58) Field of Classification Search .................. 358/1.1, 358/1.13, 1.15, 401, 403, 442; 382/115, 382/118
See application file for complete search history.

(56) References Cited

U.S. PATENT DOCUMENTS

| | | | |
|---|---|---|---|
| 7,586,635 B2 * | 9/2009 | Maeda et al. ................ | 358/1.15 |
| 7,646,501 B2 * | 1/2010 | Ikeda et al. ................. | 358/1.15 |
| 2007/0024921 A1 * | 2/2007 | Ohta .......................... | 358/448 |

FOREIGN PATENT DOCUMENTS

| | | |
|---|---|---|
| JP | 2003-178304 | 6/2003 |
| JP | 2004-252501 A | 9/2004 |
| JP | 2004-258764 A | 9/2004 |
| JP | 2004252501 A * | 9/2004 |
| JP | 2005-084824 A | 3/2005 |
| JP | 2006-133847 A | 5/2006 |
| JP | 2006-163758 | 6/2006 |
| JP | 2006-243798 A | 9/2006 |

* cited by examiner

*Primary Examiner* — Thomas D Lee
(74) *Attorney, Agent, or Firm* — Canon USA, Inc., IP Division

(57) ABSTRACT

When a client PC receives a request for printing output data, an imaging apparatus captures an image of a user. The image data of the user captured by the imaging apparatus and the output data is transferred to a management server. The management server performs predetermined image processing on the acquired image data, calculates a characteristic amount of the image data of the user, and registers the calculated characteristic amount and the output data by associating with each other. When the user requests printing of the output data from an image forming apparatus, image data of the user captured by the imaging apparatus is transferred to the management server. The management server calculates a characteristic amount of the acquired image data of the user, compares the calculated characteristic amount with the characteristic amount in the management server, and transfers the output data to the image forming apparatus.

5 Claims, 23 Drawing Sheets

FIG.6

DOCUMENT DATA INFORMATION

| MANAGEMENT ID | DOCUMENT DATA STORAGE LOCATION |
|---|---|
| 1002100 | /data/doc/1002100/ |
| 1002101 | /data/doc/1002101/ |
| 1002102 | /data/doc/1002102/ |
| ⋮ | ⋮ |

FACE IMAGE DATA INFORMATION

| MANAGEMENT ID | FACE IMAGE DATA STORAGE LOCATION |
|---|---|
| 1002100 | /data/face/1002100/ |
| 1002101 | /data/face/1002101/ |
| 1002102 | /data/face/1002102/ |
| ⋮ | ⋮ |

CHARACTERISTIC AMOUNT DATA INFORMATION

| MANAGEMENT ID | CHARACTERISTIC AMOUNT DATA |
|---|---|
| 1002100 | /data/feature/1002100/ |
| 1002101 | /data/feature/1002101/ |
| 1002102 | /data/feature/1002102/ |
| ⋮ | ⋮ |

FIG.13

DOCUMENT DATA INFORMATION

| MANAGEMENT ID | DOCUMENT DATA STORAGE LOCATION | ENCRYPTION ALGORITHM |
|---|---|---|
| 1002100 | /data/doc/1002100/ | DES |
| 1002101 | /data/doc/1002101/ | |
| 1002102 | /data/doc/1002102/ | RC4 |
| ⋮ | ⋮ | ⋮ |

FIG.21

STORAGE MEDIUM SUCH AS FD/CD-ROM

DIRECTORY INFORMATION

PROGRAM CODE CORRESPONDING
TO STEPS IN FLOW CHART OF FIG. 4

PROGRAM CODE CORRESPONDING
TO STEPS IN FLOW CHART OF FIG. 12

FIG.22

STORAGE MEDIUM SUCH AS FD/CD-ROM

DIRECTORY INFORMATION

PROGRAM CODE CORRESPONDING
TO STEPS IN FLOW CHART OF FIG. 5

PROGRAM CODE CORRESPONDING
TO STEPS IN FLOW CHART OF FIG. 8

FIG.23

STORAGE MEDIUM SUCH AS FD/CD-ROM

| DIRECTORY INFORMATION |
|---|
| PROGRAM CODE CORRESPONDING TO STEPS IN FLOW CHART OF FIG. 7 |
| PROGRAM CODE CORRESPONDING TO STEPS IN FLOW CHART OF FIG. 9 |
| PROGRAM CODE CORRESPONDING TO STEPS IN FLOW CHART OF FIG. 11 |
| PROGRAM CODE CORRESPONDING TO STEPS IN FLOW CHART OF FIG. 14 |
| PROGRAM CODE CORRESPONDING TO STEPS IN FLOW CHART OF FIG. 15 |
| PROGRAM CODE CORRESPONDING TO STEPS IN FLOW CHART OF FIG. 17 |
| PROGRAM CODE CORRESPONDING TO STEPS IN FLOW CHART OF FIG. 19 |
| PROGRAM CODE CORRESPONDING TO STEPS IN FLOW CHART OF FIG. 20 |

IMAGE FORMING SYSTEM UTILIZING NETWORK CAMERA

BACKGROUND OF THE INVENTION

1. Field of the Invention

The present invention relates to data processing performed by an image forming system including a plurality of image forming apparatuses, management apparatuses, and information processing apparatuses.

2. Description of the Related Art

In recent years, along with demand for security of a print product and a print method as well as an increased number of image forming apparatuses, a print environment in an office or public facilities has been changed. As one of such changes, demand for a "pull printing system" has increased. The "pull printing system" refers to a system in which an image forming apparatus acquires document data from a server and prints the acquired document data.

In the pull printing system, a user generally inputs a user identification (ID) and a password via an input unit of the image forming apparatus and searches for document data registered in the server.

Then, the image forming apparatus acquires the searched document data from the server according to an instruction from the user and prints the acquired document data. In a case of printing document data with such a method, the user may be required to wait for a longer time in front of the image forming apparatus until printing is completed as compared with an ordinary case of printing the data with a printer driver from a personal computer (PC).

Meanwhile, demand for improving security has increased in various fields, and a user authentication unit that authenticates a user by utilizing physical information (biometric information) about a user is discussed. For example, Japanese Patent Application Laid-Open No. 2003-178304 discusses a method for user authentication by extracting facial parts such as eyes, nose, and mouth from a face image of the user to calculate a characteristic amount of the user's face, and evaluating a degree of similarity to a previously registered face image.

In addition, Japanese Patent Application Laid-Open No. 2006-163758 discusses an authentication method in the above-described pull printing system using biometric information.

In the method discussed in Japanese Patent Application Laid-Open No. 2006-163758, a fingerprint and information acquired by a face image recognition of a user, for example, are used instead of the user ID and the password input by the user to perform the user authentication, so that the user does not need to input the user ID and the password via a generally small-sized screen of the image forming apparatus.

However, the user authentication by using biometric information can save only the user's trouble of inputting the user ID and the password, but the problem that the user needs to wait in front of the image forming apparatus for a long time until the printing is completed cannot be solved.

That is, in the above-described conventional method, the user cannot issue a request for searching for document data to the server unless the user inputs any information to the image forming apparatus. Thus, it takes a long time to start the search for the document data.

In addition to the time for the search, time is further taken for acquiring document data to be printed and converting a format of the acquired document data into a printable format. Accordingly, the time required from the issuance of a print request to the completion of the printing may become long.

SUMMARY OF THE INVENTION

The present invention is directed to a method for efficiently performing pull printing processing on output data which a user wants to print with a simple operation.

According to an aspect of the present invention, an image forming system comprising an image forming apparatus, a management apparatus, and an information processing apparatus, wherein the information processing apparatus includes a first imaging unit configured to capture an image of a user who has issued an instruction for outputting output data, and a transfer unit configured to transfer to the management apparatus, image data of the user captured by the first imaging unit and the output data that can be output by the image forming apparatus, wherein the management apparatus includes a first receiving unit configured to receive the image data and the output data transferred from the information processing apparatus, a generation unit configured to generate user characteristic information for identifying the output data from the image data received by the first receiving unit, a storage unit configured to store the image data and the output data received by the first receiving unit and the user characteristic information generated by the generation unit in association with one another, an acquisition unit configured to acquire, from the image forming apparatus, image data used for searching for the output data stored in the storage unit, a creation unit configured to create user characteristic information from the image data acquired by the acquisition unit, a searching unit configured to search for output data that can be output according to the user characteristic information created by the creation unit and the user characteristic information generated by the generation unit, and a sending unit configured to send the output data extracted as a result of a search by the searching unit and the image data associated with the output data to the image forming apparatus from which the first receiving unit has received the image data, wherein the image forming apparatus includes a second imaging unit configured to capture an image of the user who operates the image forming apparatus, a requesting unit configured to transfer the image data of the user captured by the second imaging unit to the management apparatus and request the management apparatus to send the output data stored in the management apparatus, a second receiving unit configured to receive the output data sent from the management apparatus in response to the request by the requesting unit and the image data associated with the output data, and an output unit configured to output the output data received by the second receiving unit.

According to another aspect of the present invention, an information processing apparatus capable of communicating with a management apparatus that manages a plurality of image forming apparatuses includes an imaging unit configured to capture an image of a user who has issued an instruction for outputting output data, a generation unit configured to generate output data that can be output by at least one of the image forming apparatuses, and a transferring unit configured to transfer the output data that can be output by any of the image forming apparatuses and the image data of the user captured by the imaging unit to the management apparatus.

According to yet another aspect of the present invention, a management apparatus capable of communicating with an image forming apparatus or an information processing apparatus includes a receiving unit configured to receive image data and output data transferred from the information processing apparatus, a generation unit configured to generate user characteristic information for identifying the output data from the image data received by the receiving unit, a storage unit configured to store the image data and the output data received by the receiving unit, and the user characteristic information generated by the generation unit in association with one another, an acquisition unit configured to acquire, from the image forming apparatus, image data used for searching for the output data stored in the storage unit, a creation unit configured to create user characteristic information from the image data acquired by the acquisition unit, a searching unit configured to search for output data that can be output according to the user characteristic information created by the creation unit and the user characteristic information generated by the generation unit, and a sending unit configured to send the output data extracted as a result of a search by the searching unit and the image data associated with the output data to the image forming apparatus.

According to yet another aspect of the present invention, an image forming apparatus capable of communicating with a management apparatus includes an imaging unit configured to capture an image of a user who operates the image forming apparatus, a requesting unit configured to transfer the image data of the user captured by the imaging unit to the management apparatus and request the management apparatus to send output data stored in the management apparatus, a receiving unit configured to receive the output data sent from the management apparatus in response to the request by the requesting unit and the image data associated with the output data, and an output unit configured to output the output data received by the receiving unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6 illustrates an example of document data, face image data, and characteristic amount data stored by the data storage device illustrated in FIG. 3.

FIG. 13 illustrates an example of information in the document data illustrated in FIG. 3.

FIG. 21 illustrates a memory map of a storage medium storing various data processing programs that can be read by the information processing apparatus according to an exemplary embodiment of the present invention.

FIG. 22 illustrates a memory map of a storage medium storing various data processing programs that can be read by the management apparatus according to an exemplary embodiment of the present invention.

FIG. 23 illustrates a memory map of a storage medium storing various data processing programs that can be read by the image forming apparatus according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

First Exemplary Embodiment

Figure 1:
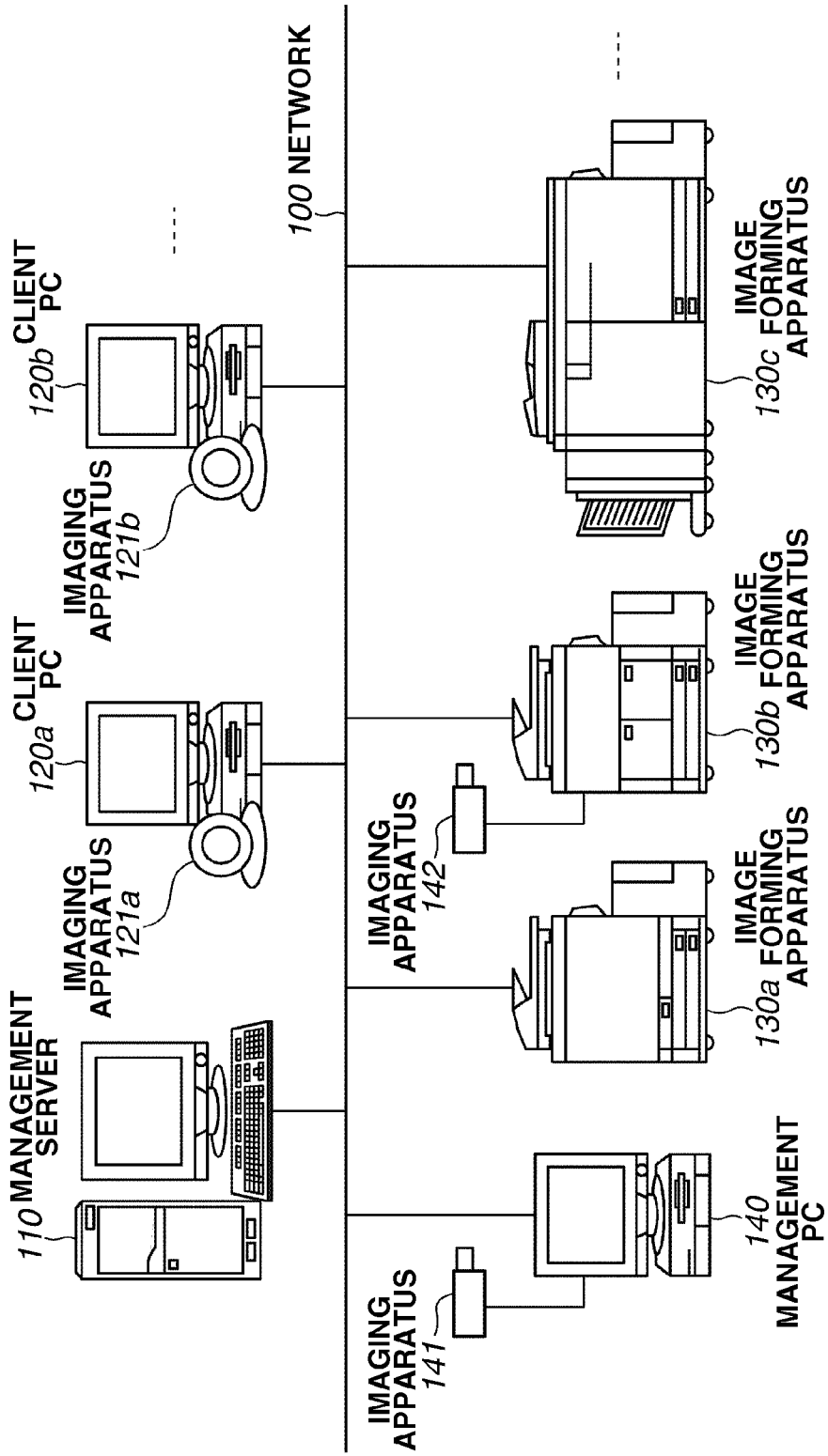
FIG. 1 illustrates an example of an entire configuration of an image forming system according to a first exemplary embodiment of the present invention.

A first exemplary embodiment of the present invention is described below. FIG. 1 illustrates an example of an entire configuration of an image forming system according to the first exemplary embodiment of the present invention. In the example illustrated in FIG. 1, the image forming system includes a plurality of image forming apparatuses, a plurality of client PCs, and a management server which are communicably connected with one another via a network 100.

Referring to FIG. 1, a management server 110, client PCs 120a and 120b, and image forming apparatuses 130a through 130c for printing are connected via the network 100. The management server 110 manages document data input and registered by a user and face image data of the user. The face image data is used as authentication information for searching for and acquiring the document data registered in the management server 110.

An imaging apparatus 121a is connected to the client PC 120a and captures a face image of the user when the user issues a print request. In the same way, an imaging apparatus 121b is connected to the client PC 120b and captures a face image of the user when the user issues a print request. The imaging apparatus 121a captures an image of the user who issues an instruction for outputting output data generated by the client PC 120a.

Image data of the user captured by the imaging apparatus 121a includes image data used for specifying a physical characteristic of the user. Here, as a body part for identifying the physical characteristic of the user, an entire face or a portion of the face of the user (ears, a nose, eyes, eyebrows, or a combination thereof), for example, can be used.

In the present exemplary embodiment, predetermined image processing is performed on the image data of the entire face of the user to calculate a characteristic amount. The obtained characteristic amount can function as information for searching for output data. Accordingly, the present invention can be applied to a system that utilizes a body part other than the entire face of the user.

An imaging apparatus 141 is connected to a management PC 140 via a predetermined interface and captures an image around the image forming apparatus. An imaging apparatus 142 is connected to the image forming apparatus 130b via a predetermined interface.

The management PC 140 is connected to the network 100 as well as the image forming apparatuses 130a through 130c.

The image forming system illustrated in FIG. 1 includes a plurality of the client PCs 120a and 120b, a plurality of the imaging apparatuses 121a and 120b, a plurality of the image forming apparatuses 130a through 130c, and a plurality of the imaging apparatuses 141 and 142.

Each of the management server 110, the client PCs 120a and 120b, and the management PC 140 is constituted by an information processing apparatus (a computer) including a central processing unit (CPU), a read-only memory (ROM), a random access memory (RAM), and a hard disk drive (HDD), as will be described in detail below. In addition, a predetermined operating system (OS) is installed on each of the management server 110, the client PCs 120a and 120b, and the management PC 140.

In the present exemplary embodiment, the Internet is used as the network 100. However, other network systems such as a local area network (LAN) can be used as the network 100.

Each of the imaging apparatuses 121a and 121b is constituted by an apparatus that can be connected to and controlled by a computer, such as a web camera, which recently has been widely used.

Further, a monitoring camera installed in a convenience store or the web camera can be used as the imaging apparatus 142 that captures the image around the image forming apparatus 130b, for example.

That is, in the image forming system, the web camera can be additionally connected to the image forming apparatus 130b, or a monitoring camera that monitors a shop can be used to capture an image of the user.

In the image forming system illustrated in FIG. 1, the imaging apparatus 142 functions as a first imaging apparatus and each of the imaging apparatuses 121a and 121b functions as a second imaging apparatus.

Figure 2:
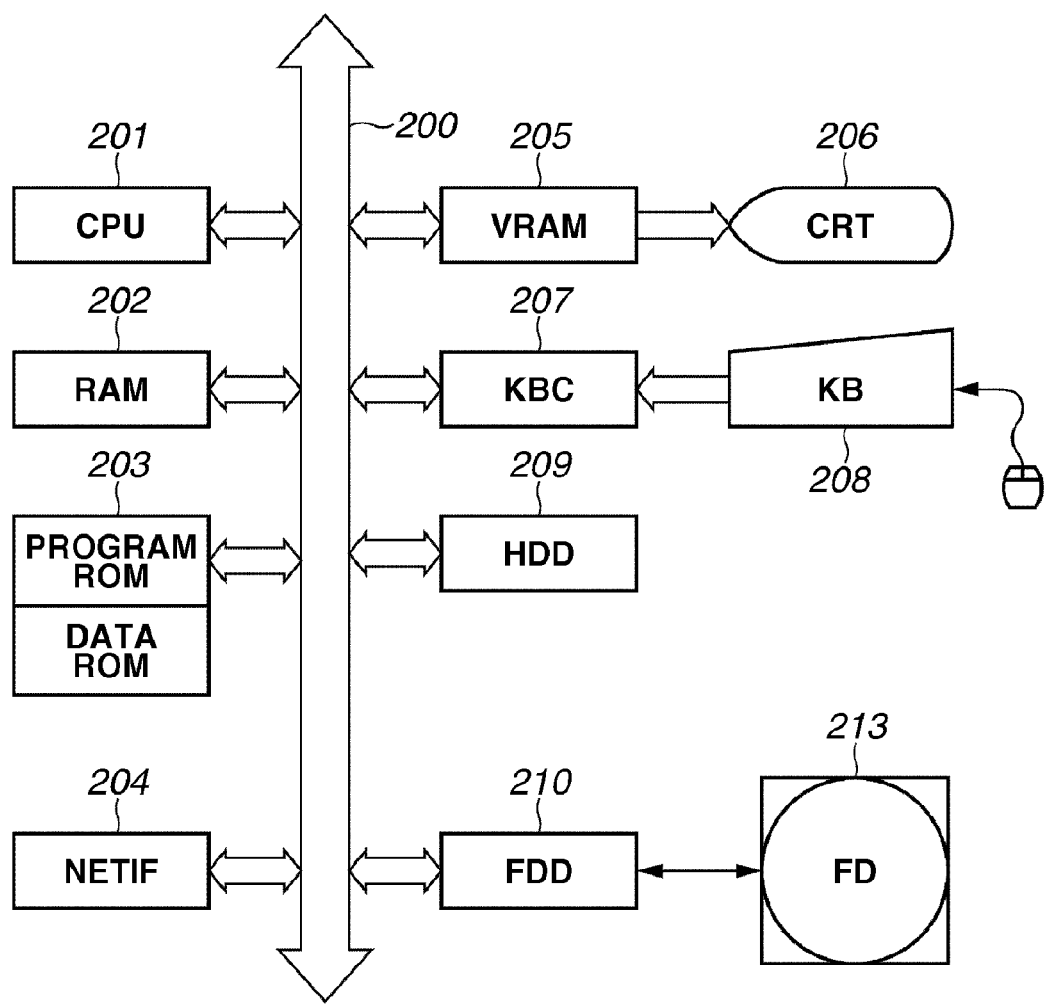
FIG. 2 is a block diagram illustrating an example of a specific configuration of a management server, a client PC, and a management PC illustrated in FIG. 1.

FIG. 2 is a block diagram illustrating an example of a specific configuration of the management server 110, the client PCs 120a and 120b, and the management PC 140 illustrated in FIG. 1. In the following description, each of the management server 110, the client PCs 120a and 120b, and the management PC 140 is described as an information processing apparatus.

Referring to FIG. 2, a central calculation unit (hereinafter, referred to as a CPU) 201 performs calculation and controls the entire image processing apparatus. A RAM 202 functions as a main memory for the CPU 201, an area for storing a program to be executed, and an execution area and data area of the stored program.

A ROM 203 stores operating procedure for the CPU 201. The ROM 203 includes a program ROM that records an OS, which is a system program for controlling units, devices, and modules of the information processing apparatus and a data ROM that stores information that is necessary to operate the system. An HDD 209, which will be described below, can be used instead of the ROM 203.

A network interface (NETIF) 204 performs control for transmitting data between the information processing apparatuses via the network and a diagnosis with respect to a connection status with other apparatus.

A video RAM (VRAM) 205 rasterizes image data to be displayed on a screen of a cathode ray tube (CRT) 206 that indicates an operation state of the information processing apparatus, which will be described below, and controls the display.

The CRT 206 is a display device. A controller (hereinafter referred to as a "KBC") 207 controls an input signal from an external input apparatus 208.

The external input device (hereinafter referred to as a "KB") 208 receives a user operation. A keyboard and a pointing device such as a mouse are used as the KB 208.

The HDD 209 stores an application program and various types of data. The application program according to the present exemplary embodiment is a software program for executing various processing units according to the present exemplary embodiment.

A removable medium such as a floppy disk, a flexible disk, or a compact disk-read only memory (CD-ROM) can be inserted in or removed from an external input and output device (hereinafter referred to as an "FDD") 210. The FDD 210 is used to read the application program from the medium.

A removable data recording device (a removable medium) (hereinafter referred to as "FD") 213 includes a magnetic recording medium (e.g., a floppy disk or an external hard disk), an optical recording medium (e.g., a CD-ROM), an magneto-optical recording medium such as a magneto-optical disk (MO), and a semiconductor recording medium such as a memory card, for example.

The application program and the data stored on the HDD 209 can be stored on the FDD 210 to be used.

A data transmission bus (an address bus, a data bus, an input/output bus and a control bus) 200 connects the above-described units.

Figure 3:
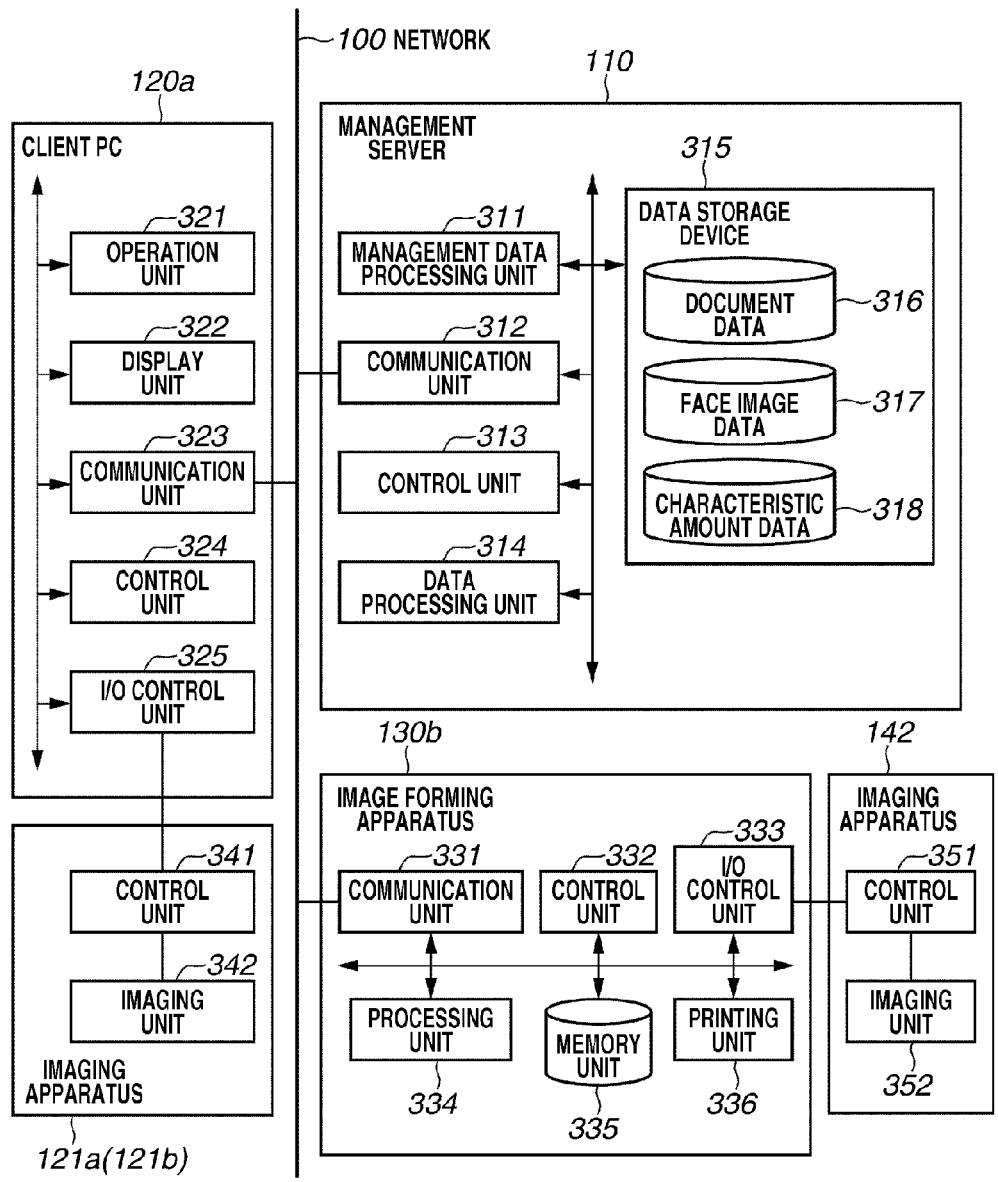
FIG. 3 is a block diagram illustrating an example of a configuration of each processing modules in the management server, the client PC, and the image forming apparatus in the image forming system according to an exemplary embodiment of the present invention.

FIG. 3 is a block diagram illustrating an example of a configuration of processing modules of the management server 110, the client PC 120a, and the image forming apparatus 130b in the image forming system of the present exemplary embodiment. In the following description, the processing modules operating in the image forming system, storage devices for storing information in the image forming system, and a control and an information flow among the processing modules and the storage devices are described.

The management server 110 illustrated in FIG. 3 includes a management data processing unit 311, a communication unit 312, a control unit 313, a data processing unit 314, and a data storage device 315, each of which functions as the processing module. Further, the data storage device 315 is constituted by a document data portion 316, a face image data portion 317, and a characteristic amount data portion 318.

Referring to FIG. 3, the data storage device 315 uses a file system or a database system and stores data on at least one of the HDD 209, the RAM 202, and the FDD 210 of the management server 110. Furthermore, the data stored in the data storage device 315 can be directly and specifically accessed using a specific key or under a specific condition.

The client PC 120a includes an operation unit 321, a display unit 322, a communication unit 323, a control unit 324, and an input/output (I/O) control unit 325, each of which functions as the processing module.

The image forming apparatus 130b includes a communication unit 331, a control unit 332, an I/O control unit 333, a processing unit 334, and a printing unit 336, each of which functions as the processing module. Further, the image forming apparatus 130b includes a memory unit 335 that stores various types of data including image data.

Any of the above-described processing modules operates as an application program or a part of the application program that is read from the ROM 203, the HDD 209, or the FDD 210 illustrated in FIG. 2, rasterized on the RAM 202, and used by the CPU 201.

Each of the imaging apparatuses 121a and 121b includes a control unit 341 and an imaging unit 342, each of which functions as the processing module.

The imaging apparatus 142 includes a control unit 351 and an imaging unit 352, each of which functions as the processing module.

Each of these processing modules operates as an application program or a part of the application program that is read from a ROM or an HDD in the imaging apparatus, rasterized on the RAM, and used by the CPU.

The management PC 140 is not illustrated in FIG. 3. However, in a case where the management PC 140 and the imaging apparatus 141 are used in the image forming system, the modules similar to those of the client PC 120a and the imaging apparatus 121a are connected to the network 100 in the similar way.

Further, arrows illustrated in FIG. 3 indicate a main control and a main information flow among the processing modules.

A relationship among the management server 110, the processing modules included in the management server 110 and the data storage device 315 is automatically started or started in response to information or an instruction which is input by a user by operating the KB 208, expanded into the RAM 202 as necessary, and transmitted to the CPU 201 via the KBC 207.

The processing module required for the calculation by the CPU 201 and the information stored in the data storage device 315 are expanded into the RAM 202 from the ROM 203, the HDD 209, the FDD 210, or the RAM 202, and transmitted to the CPU 201.

Then, the CPU 201, as necessary, writes a result of the calculation in a data storage area of the RAM 202, the HDD 209, or the FDD 210. At the same time, the CPU 201, as necessary, displays the result of the calculation on the CRT 206 via the VRAM 205. The data transmission among the CPU 201, the RAM 202, the ROM 203, the NETIF 204, the VRAM 205, the KBC 207, the HDD 209, and the FDD 210 is performed via the data transmission bus 200.

Any general connection format, for example, the universal serial bus (USB) can be used for the connection between the client PC 120a and the imaging apparatuses 121a and 121b and the connection between the image forming apparatus 130b and the imaging apparatus 142. Accordingly, the connection format is not particularly described in the present invention.

Now, the data processing according to the present exemplary embodiment will be described below with reference to FIG. 3.

In the example illustrated in FIG. 3, the user starts the application from the client PC 120a to generate document data. Then, the user issues a request for registering the generated document data via the network 100 such as the Internet to the management server 110.

During processing for registering the document data, the imaging apparatus 121a which is connected to the client PC 120a captures a face image of the user who operates the client PC 120a.

Then, the client PC 120a acquires the captured face image data of the user from the imaging apparatus 121a. Then, the client PC 120a sends the captured face image data of the user to the management server 110 together with the document data to be registered. The face image data of the user and the document data can be encrypted and sent to the management server 110.

When the document data and the face image data from the client PC 120a are received, the management server 110 registers the received data in the data storage device 315. In addition, the management server 110 performs image processing on the received face image data to calculate a characteristic amount of the face image data. The management server 110 registers the calculated characteristic amount in the characteristic amount data portion 318 together with the face image data.

When the imaging apparatus 142 detects that the user has approached the image forming apparatus 130b, the management server 110 sends the image data of the captured face image of the user to the image forming apparatus 130b.

The image forming apparatus 130b uses the face image data received from the imaging apparatus 142 and sends a request for searching for and acquiring the document data to the management server 110.

When the request for searching for and acquiring the document data from the image forming apparatus 130b is received, the management server 110 calculates the characteristic amount based on the received face image data. Then, the management server 110 searches the data storage device 315 for data having a characteristic amount that is approximate to the calculated characteristic amount.

When it is determined that the characteristic amount data approximate to the calculated amount exists within the data storage device 315, then the management server 110 sends a management ID for the document data and the face image data associated with the characteristic amount data to the image forming apparatus 130b which is a request source.

When the management ID for the document data and the face image data are received from the management server 110 as a reply to the request for searching for and acquiring the document data, the image forming apparatus 130b downloads the document data and the face image data according to the received management ID.

Then, the image forming apparatus 130b displays the face image data among the data downloaded from the management server 110 on the display unit.

Here, the user views the face image data displayed on the display unit of the image forming apparatus 130b to select the face image data of the user's own. Then, the image forming apparatus 130b prints the document data associated with the selected face image data. When the operation by the user is completed, the image forming apparatus 130b discards other data.

With the above-described processing, the user can print the document data that the user has registered in the management server 110 by automatically downloading the registered document data from the management server 110 without entering the user ID for the user authentication.

Now, each processing is described in detail below with reference to a flowchart.

Figure 4:
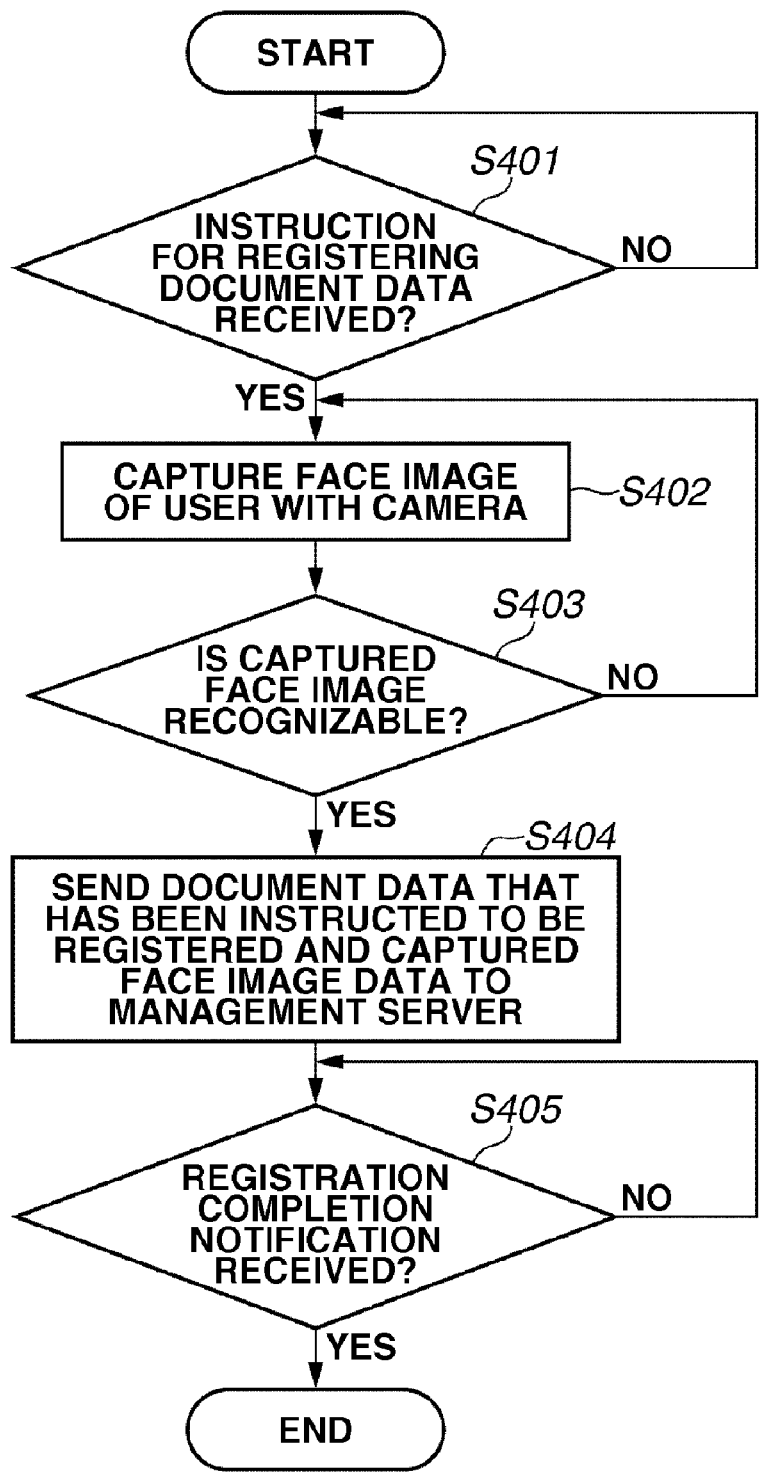
FIG. 4 is a flowchart illustrating an example of data processing performed by the information processing apparatus according to an exemplary embodiment of the present invention.

FIG. 4 is a flowchart illustrating an example of data processing performed by the information processing apparatus according to the present exemplary embodiment. The example illustrated in FIG. 4 describes the processing performed by the client PC 120a when the user operates the client PC 120a to issue a request for printing document data.

Each step is implemented by the CPU of the client PC 120a that loads a control program (including the processing module) stored in the HDD 209, the FD 213, or the ROM 203 on the RAM 202 and executes the control program. In the present exemplary embodiment, the face image is used as user characteristic information for identifying output data to be output from the image forming apparatus.

Referring to FIG. 4, in step S401, the CPU of the client PC 120a determines whether an instruction for registering the printing of document data is received from the user via the operation unit 321. When it is determined in step S401 that the instruction for registering the printing of document data is received (YES in step S401), the processing advances to step S402. The document data includes information generated using an application installed on the client PC 120a, information received from other apparatuses, and output data generated by processing information input as an image from other apparatuses. In addition, the output data can be output by the image forming apparatus (FIG. 1) on the network.

In step S402, the I/O control unit 325 controls the camera which is the imaging apparatus 121a connected to the client PC 120a to capture a face image of the user who has issued the instruction using the imaging unit 342. Here, it is useful if a message that prompts the user to stand to face the imaging apparatus 121a is displayed and the user can set timing for capturing his/her face image.

In step S403, the control unit 324 detects the face of the user from the face image captured by the imaging apparatus 121a and determines whether the detected face of the user can be recognized as the face image. When it is determined in step S403 that the detected face cannot be recognized as a face image (NO in step S403), then the processing returns to step S402 to perform another capturing operation.

On the other hand, when it is determined in step S403 that the captured face of the user can be recognized by the control unit 324 as a face image (YES in step S403), the processing advances to step S404. In step S404, the CPU of the client PC 120a sends the document data instructed to be registered in step S401 and the face image data captured in step S402 from the communication unit 323 to the management server 110.

In step S405, the CPU of the client PC 120a determines whether a registration completion notification from the management server 110 is received. If it is determined in step S405 that the registration completion notification is received (YES in step S405), the processing ends. In the present exemplary embodiment, the face image is used as the image data for identifying the physical characteristic of the user. However, an image of a body part other than the face of the user or a body part around the user's face can be captured and the captured image can be used as information for searching for output data.

Figure 5:
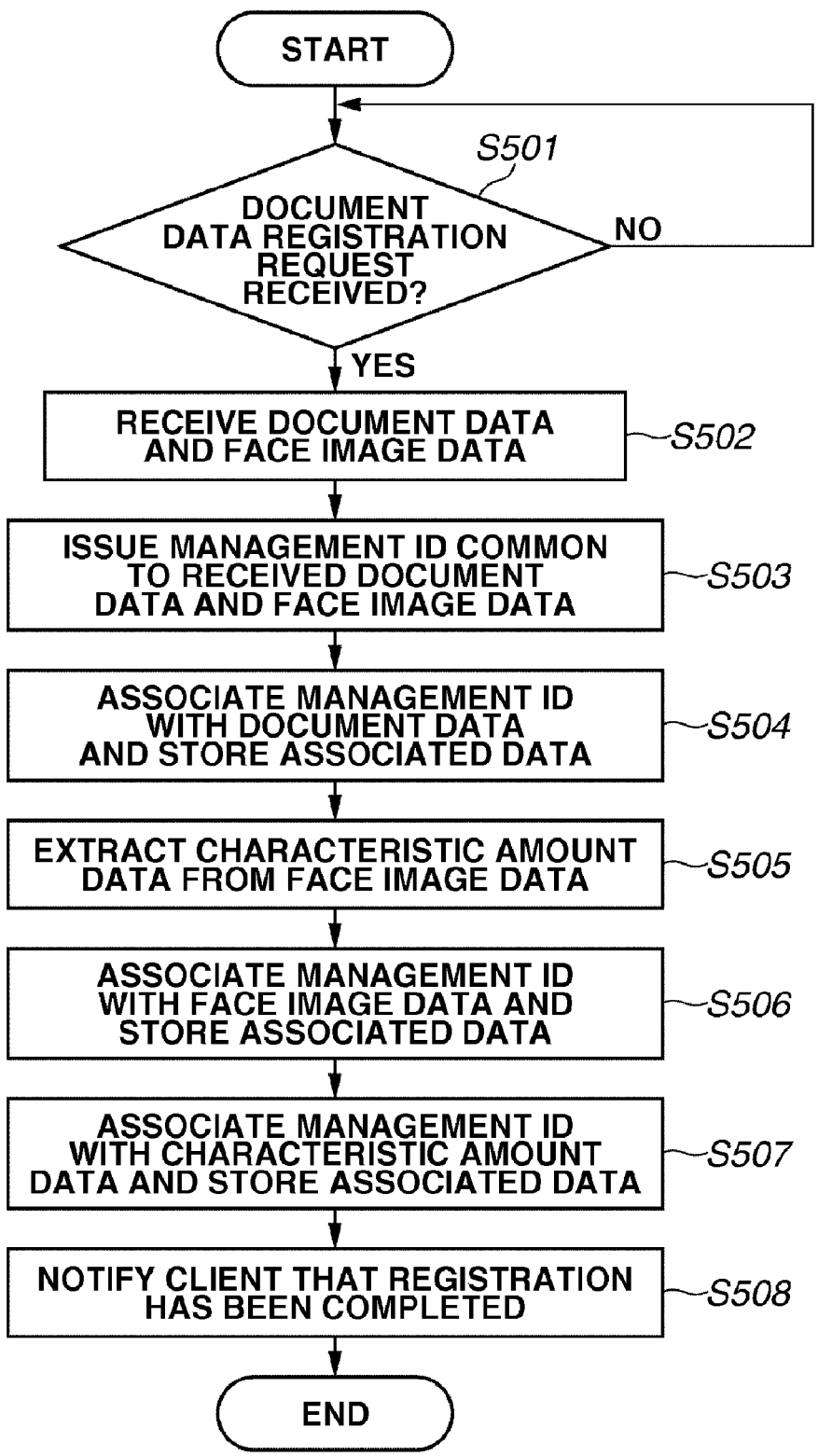
FIG. 5 is a flowchart illustrating an example of data processing performed by the management apparatus according to an exemplary embodiment of the present invention.

FIG. 5 is a flowchart illustrating an example of data processing performed by the management apparatus according to the present exemplary embodiment. The example illustrated in FIG. 5 describes the processing that the management server 110 performs when the management server 110 receives the request for printing document data from the client PC 120.

Each step is implemented by the CPU of the management server 110 that loads the control program (including the processing module) stored in the HDD 209, the FD 213, or the ROM 203 on the RAM 202 and executes the control program.

Referring to FIG. 5, in step S501, the communication unit 312 determines whether the request for printing document data has been received from the client PC 120a. When it is determined in step S501 that the request for printing document data has been received from the client PC 120a (YES in step S501), the processing advances to step S502. In step S502, the management server 110 receives the document data and the face image data together with the print request.

In step S503, the management data processing unit 311 issues a common unique management ID which is used by the management server 110 to manage data to the document data and the face image data received in step S502.

In step S504, the CPU of the management server 110 stores the document data and information about the management ID received from the client PC 120a in the document data portion 316 in the data storage device 315.

In step S505, the data processing unit 314 performs processing for extracting characteristic amount data from the face image data received from the client PC 120a. Here, any data which is generated by processing image data can be used as the characteristic amount data to be extracted.

In this regard, for example, data generated by the conventional method discussed in Japanese Patent Application Laid-Open No. 2003-178304 can be used. The processing for extracting the characteristic amount data is not described in detail here since it is not essential to the present invention.

In step S506, the management data processing unit 311 stores the received face image data and the management ID issued in step S503 in the face image data portion 317 in the data storage device 315.

In step S507, the management data processing unit 311 stores the characteristic amount data extracted in step S505 and the management ID issued in step S503 in the characteristic amount data portion 318 in the data storage device 315. When the above-described processing is completed, in step S508, the CPU of the management server 110 sends a notification that the registration processing has been completed from the communication unit 312 to the client PC 120a, which is the request source. Then, the processing ends.

FIG. 6 illustrates an example of data that is stored in the data storage device 315 in the processing in each of steps S504, S506, and S507.

FIG. 6 illustrates an example of the document data portion 316, the face image data portion 317, and the characteristic amount data portion 318 stored in the data storage device 315 illustrated in FIG. 3.

In the example illustrated in FIG. 6, the management ID and information about a storage location of the received document data in the management server 110 are mutually associated. The document data portion 316 stores the mutually associated management ID and the information about the storage location as one record.

Further, the management ID is associated with information about a storage location of the received face image data in the management server 110. The face image data portion 317 stores the mutually associated management ID and the information about the storage location as one record.

Furthermore, the management ID is associated with information about a storage location of the extracted characteristic amount data in the management server 110. The characteristic amount data portion 318 stores the mutually associated management ID and the information about the storage location of the extracted characteristic amount data.

Now, processing is described that is performed by the image forming apparatus 130b, the imaging apparatus 142, and the management server 110 when the user approaches the image forming apparatus 130b to perform printing.

Processing performed by the image forming apparatus 130b and the imaging apparatus 142 is described with reference to a flowchart illustrated in FIG. 7.

Figure 7:
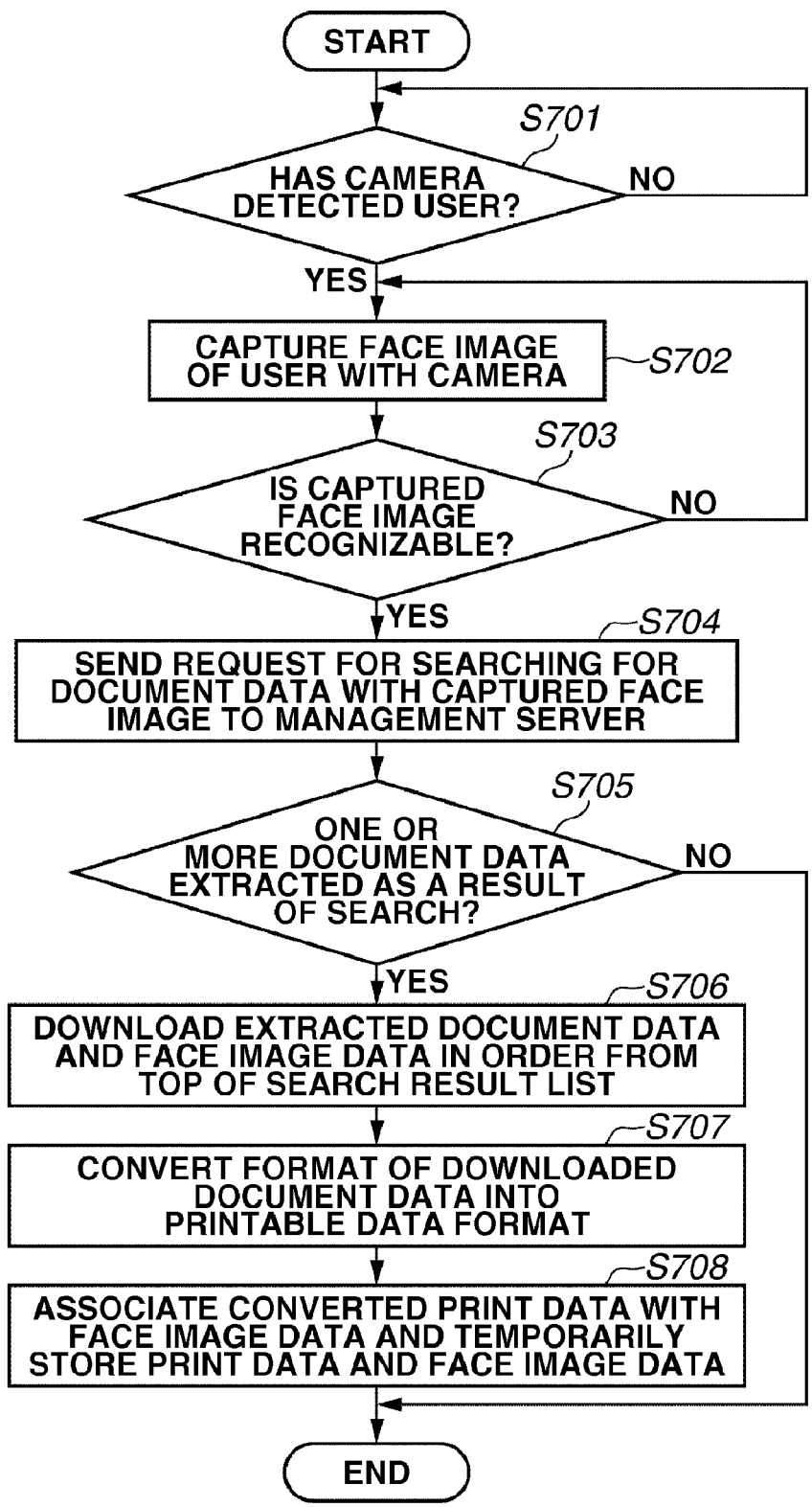
FIG. 7 is a flowchart illustrating an example of data processing performed by the image forming apparatus according to an exemplary embodiment of the present invention.

FIG. 7 is a flowchart illustrating an example of data processing performed by the image forming apparatus according to the present exemplary embodiment. The example illustrated in FIG. 7 describes the processing for acquiring document data registered in the management server 110 based on the face image data of the user captured by the image forming apparatus 130b and processing the acquired document data.

Each step is implemented by the CPU of the image forming apparatus 130b that loads the control program (including the processing module) stored in the HDD 209, the FD 213, or the ROM 203 on the RAM 202 and executes the control program.

Referring to FIG. 7, in step S701, the CPU of the image forming apparatus 130b determines whether the user has approached the image forming apparatus 130b based on the image data captured by the imaging apparatus 142.

Here, it is supposed that the imaging apparatus 142 is directly connected to the image forming apparatus 130b via a cable. However, the image forming apparatus 130b and the imaging apparatus 142 can be mutually connected via the network 100.

The image data captured by the above-described manner by the imaging unit 352 of the imaging apparatus 142 is sent to the processing unit 334 via the I/O control unit 333. Then, the processing unit 334 performs processing on the received image data and determines whether an image of a user exists in the image data captured by the imaging apparatus 142.

If it is determined in step S701 that the image of a user exists in the image data captured by the imaging apparatus 142 (YES in step S701), then the processing advances to step S702.

In step S702, the CPU of the image forming apparatus 130b issues an image capturing request from the I/O control unit 333 to the imaging apparatus 142 with respect to an area of the image data in which the image of a human has been detected to perform image capturing with the imaging apparatus 142. In step S703, the processing unit 334 performs predetermined image processing on the image data captured with the imaging apparatus 142.

Then, in step S703, the control unit 332 determines whether the face image exists in the image-processed image data. When the face image exists in the image-processed image data, then the control unit 332 further determines whether the face image is recognizable.

When the control unit 332 determines in step S703 that the face image data of a human has been detected from the captured image data as a recognizable image (YES in step S703), the processing advances to step S704.

On the other hand, when the control unit 332 determines in step S703 that no face image data of a human has been detected from the captured image data (NO in step S703), then the processing returns to step S702 to repeat the image capturing operations.

When the control unit 332 determines in step S703 that no image of a human has been extracted from the captured image data for a predetermined period of time, then the processing ends.

In step S704, the control unit 332 utilizes the image data that has been determined in step S703 as the recognizable face image data to send a request for searching for the document data using the face image data from the communication unit 331 to the management server 110.

In step S705, when the communication unit 331 receives a reply to the request sent in step S704 from the management server 110, the control unit 332 determines whether one or more search results are included in the reply.

When it is determined in step S705 that no search result is included in the reply (NO in step S705), then the processing ends.

On the other hand, when the control unit 332 determines in step S705 that one or more document data has been extracted as the search result (YES in step S705), the processing advances to step S706. In step S706, the CPU of the image forming apparatus 130b uses the management ID in the search result to send a request for downloading the document data and the face image data corresponding to the management ID from the communication unit 312 to the management server 110 and performs the downloading processing.

The management server 110 performs predetermined image processing on the received image data of the user according to the downloading request from the image forming apparatus and calculates the characteristic amount for the user. Then, the management server 110 compares the calculated characteristic amount of the user and the characteristic amount of the user (the user characteristic information) stored in the characteristic amount data portion 318 of the data storage device 315 to identify the document data to be sent to the image forming apparatus. Then, the management server 110 sends the identified document data to the image forming apparatus 130b that has received the image data to perform the download processing.

When the control unit 332 determines in step S705 that one or more document data have been extracted as the search results (YES in step S705), then the communication unit 331 downloads sequentially the document data and the face image data from the management server 110, in order from a top of a list of the search result.

The document data and the face image data downloaded by the communication unit 331 from the management server 110 are temporarily stored in the memory unit 335.

In step S707, the processing unit 334 converts a format of the document data downloaded from the management server 110 into a printable data format. In step S708, the CPU of the management server 110 associates the print data converted by the processing unit 334 into the printable data format with the downloaded face image data and temporarily stores the mutually associated data in the memory unit 335. Then, the processing ends.

Now, processing is described that is performed by the management server 110 when the image forming apparatus 130b sends the request for searching to the management server 110 in step S704.

Figure 8:
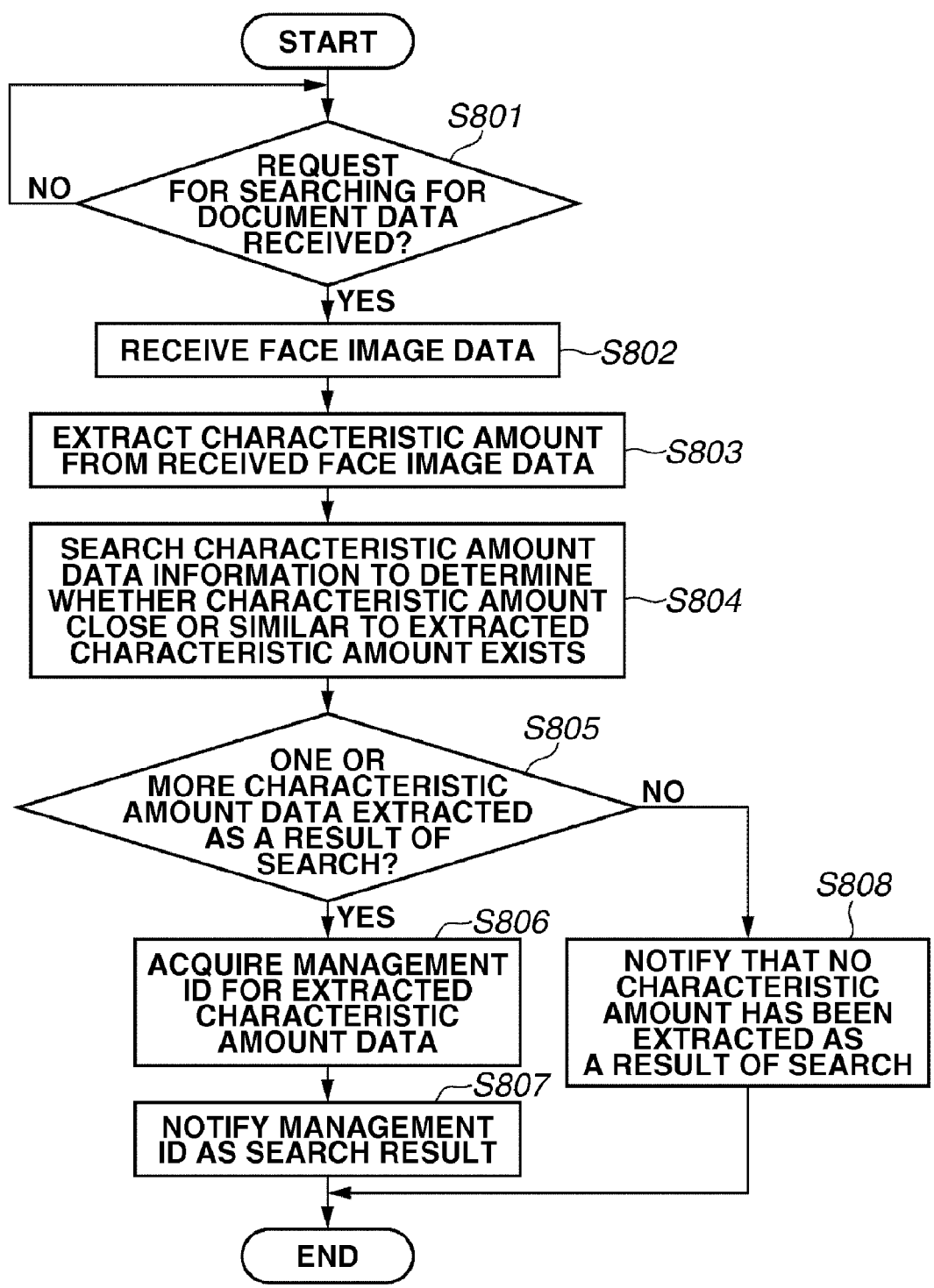
FIG. 8 is a flowchart illustrating an example of data processing performed by the management apparatus according to an exemplary embodiment of the present invention.

FIG. 8 is a flowchart illustrating an example of data processing performed by the management apparatus according to the present exemplary embodiment. The example illustrated in FIG. 8 describes the processing performed by the management server 110 when the image forming apparatus 130b sends the request for searching to the management server 110, as described above.

Each step is implemented by the CPU of the management server 110 that loads and executes the control program (including the processing module) stored in the HDD 209, the FD 213, or the ROM 203 on the RAM 202 and executes the control program.

Referring to FIG. 8, in step S801, the control unit 313 of the management server 110 determines whether the request for searching for the document data using the face image data from the image forming apparatus 130b has been received by the communication unit 312. If it is determined in step S801 that the request for searching for the document data using the face image data has been received (YES in step S801), then the processing advances to step S802.

In step S802, the communication unit 312 receives the face image data sent from the image forming apparatus 130b together with the request for searching. In step S803, after receiving the face image data from the image forming apparatus 130b, the data processing unit 314 extracts the characteristic amount from the face image data. When the data processing unit 314 extracts the characteristic amount from the face image data, the processing advances to step S804.

In the processing in step S804 and subsequent steps, the management data processing unit 311 uses the characteristic amount data extracted in step S803 to perform processing for searching for data in the data storage device 315.

In the searching processing, the management data processing unit 311 searches whether the characteristic amount data within a predetermined range of value approximate to the characteristic amount data extracted in step S804 has been registered in the characteristic amount data portion 318. In step S805, the management data processing unit 311 determines whether one or more characteristic amount data approximate to the characteristic amount data extracted in step S804 exists in the search result of step S804. When the management data processing unit 311 determines in step S805 that one or more characteristic amount data approximate to the characteristic amount data extracted in step S804 exists (YES in step S805), the processing advances to step S806.

On the other hand, when the management data processing unit 311 determines in step S805 that no characteristic amount data approximate to the characteristic amount data extracted in step S804 exists (NO in step S805), the processing advances to step S808. In step S808, the CPU of the management server 110 notifies the image forming apparatus 130b that no characteristic amount data approximate to the characteristic amount data extracted in step S804 exists as the result of the search. Then, the processing ends.

In step S806, the management data processing unit 311 acquires the management ID for all the characteristic amount data extracted as the result of the searching processing in step S804 from the characteristic amount data portion 318.

In step S807, the CPU of the management server 110 notifies the image forming apparatus 130b (i.e., the request source) of the management ID that has been acquired from the characteristic amount data portion 318 in step S806 as a reply to the request for searching. Then, the processing ends.

Now, processing is described that is performed when the user operates the image forming apparatus 130b *to perform an actual printing*.

Figure 9:
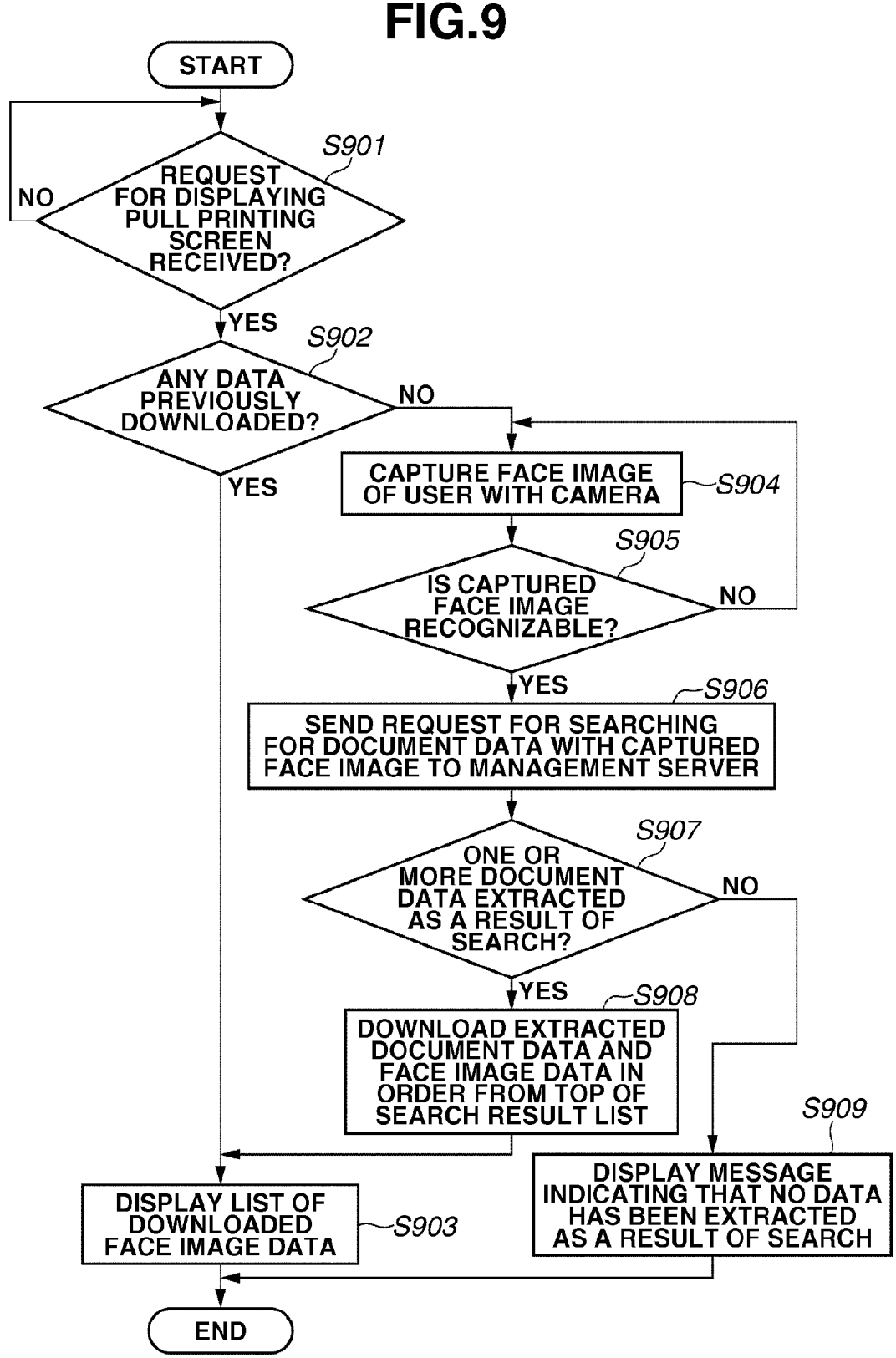
FIG. 9 is a flowchart illustrating an example of data processing performed by the image forming apparatus according to an exemplary embodiment of the present invention.

FIG. 9 is a flowchart illustrating an example of data processing performed by the image forming apparatus according to the present exemplary embodiment. In the example illustrated in FIG. 9, the document data acquired from the management server 110 is printed by the image forming apparatus 130b.

Each step is implemented by the CPU of the image forming apparatus 130b that loads the control program (including the processing module) stored in the HDD 209, the FD 213, or the ROM 203 on the RAM 202 and executes the control program.

Figure 10A:
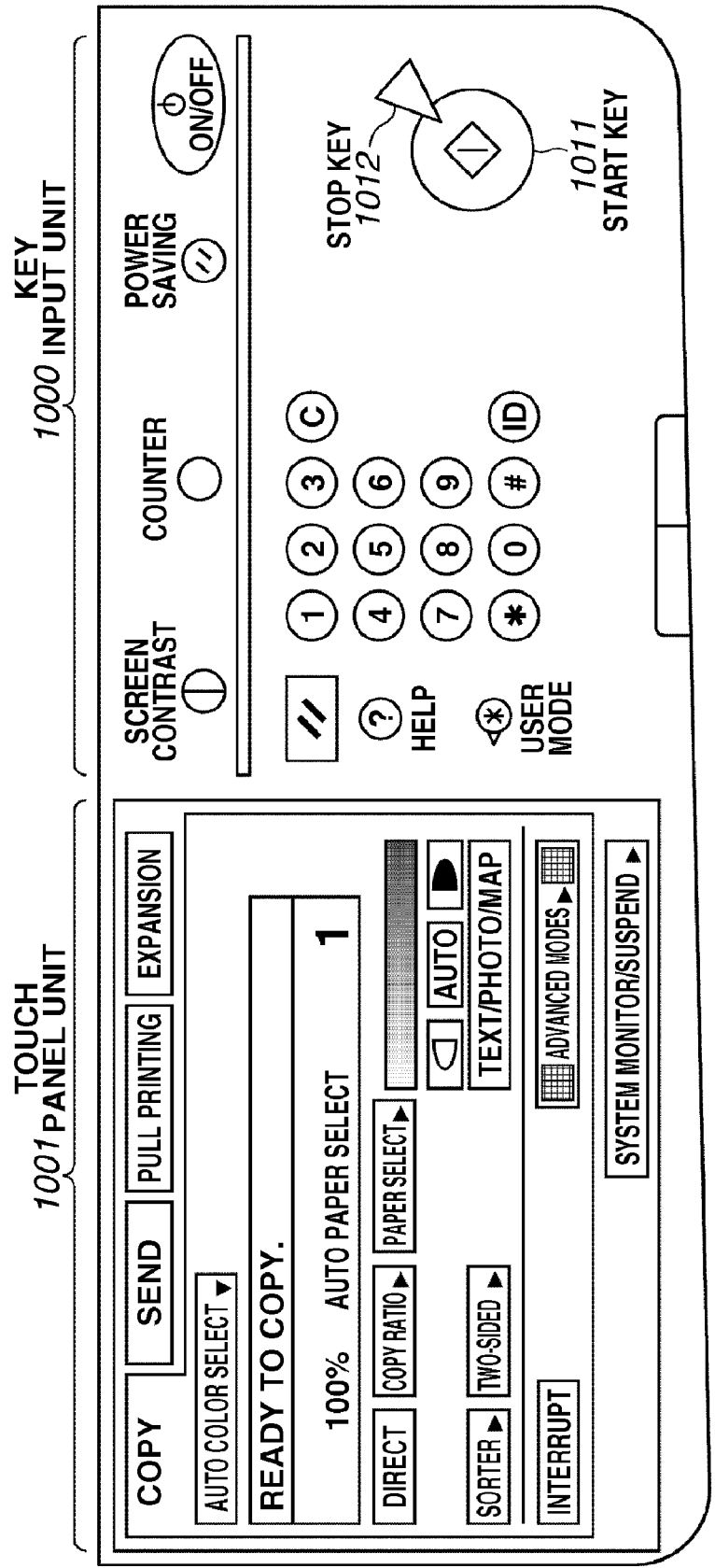
FIG. 10A illustrates an example of a configuration of an operation panel of the image forming apparatus illustrated in FIG. 3.
Figure 10B:
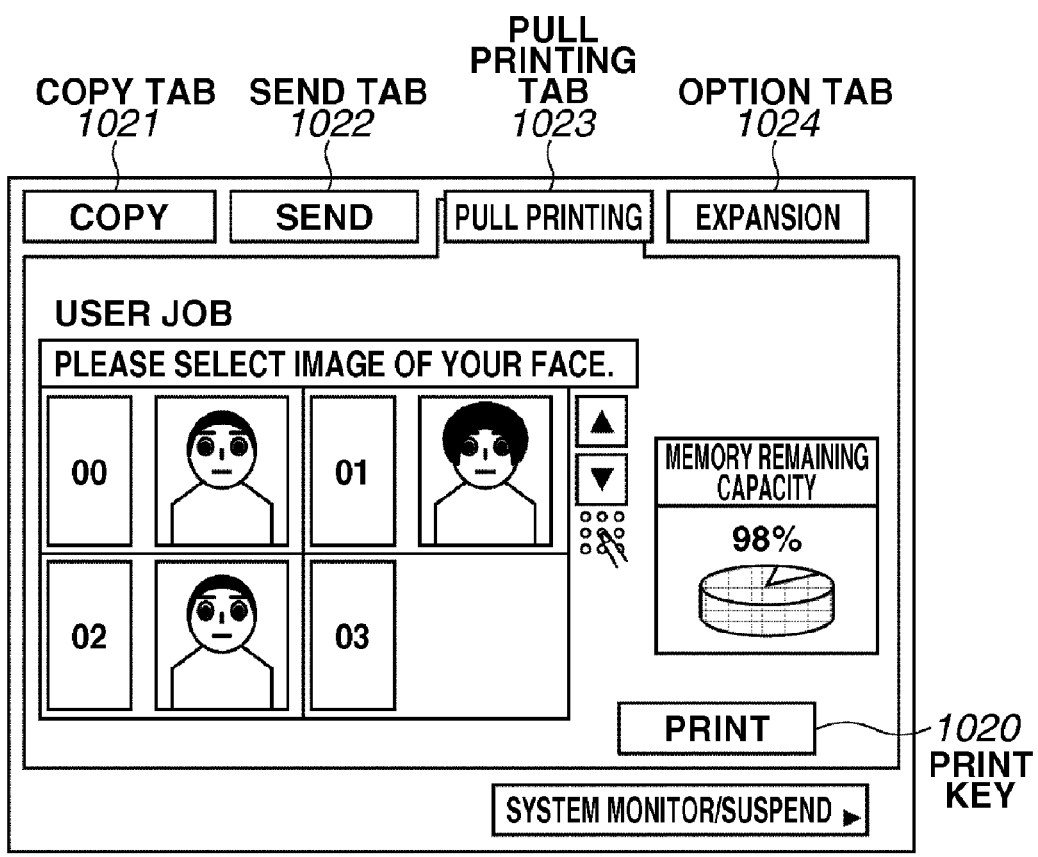
FIG. 10B illustrates an example of a configuration of an operation panel of the image forming apparatus illustrated in FIG. 3.

FIGS. 10A and FIG. 10B illustrate examples of a configuration of an operation panel of the image forming apparatus 130b illustrated in FIG. 3. FIG. 10A illustrates an example of an entire operation panel. FIG. 10B illustrates an example of a screen that displays the face image data in a touch panel portion of the operation panel, which is displayed when the user has set the pull printing.

The operation unit of the image forming apparatus 130b is constituted by a touch panel unit 1001 that can be operated by the user who touches the screen and a key input unit 1000 that can be operated by the user who presses a key.

The key input unit 1000 includes a start key 1011 and a stop key 1012 which allow the user to start and stop the processing such as copying.

The touch panel unit 1001 includes tab buttons to select a function to be used. For example, the tab buttons include a copy tab 1021, a send tab 1022, a pull printing tab 1023, and an option tab 1024, such as expansion tab.

The screen displayed on the touch panel unit 1001 is changed according a tab which is selected by the user. Here, the screen on which the user performs operation to make prints by acquiring the document data from the management server 110 according to the present exemplary embodiment is referred to as a "pull printing screen" (FIG. 10B).

The pull printing tab 1023 can be operated by the user to display the pull printing screen. The pull printing screen includes a display area for the face image data of the user and a print key 1020 which can be operated by the user to issue an instruction for printing the selected document data.

At the start of the processing, the user operates the touch panel unit 1001 of the image forming apparatus 130b to perform printing and selects the pull printing tab 1023. Referring to FIG. 9, in step S901, the control unit 332 determines whether a request for displaying the pull printing screen has been issued by the user. When the pull printing tab 1023 is selected, the control unit 332 determines in step S901 that the request for displaying the pull printing screen has been issued from the user (YES in step S901), the processing advances to step S902. Before advancing further processing, the CPU of the image forming apparatus 130b can perform user authentication processing by causing the user to enter the user ID and the password via the touch panel unit 1001 to restrict a request for performing pull printing by the user who has not been successfully authenticated.

In step S902, the control unit 332 determines whether the document data and the face image data that has been previously downloaded by the processing illustrated in FIG. 7 and temporarily stored in the memory unit 335 exists.

When the control unit 332 determines in step S902 that the document data and the face image data that has been previously downloaded and temporarily stored in the memory unit 335 exists (YES in step S902), the processing advances to step S903.

In step S903, the control unit 332 displays, on the pull printing screen, a list of the face image data included in the data temporarily stored in the memory unit 335 in order of the search result, as illustrated in FIG. 10B. Then, the processing ends. In the example illustrated in FIG. 10B, three pieces of the face image data are displayed as a list on the pull printing screen.

On the other hand, when the control unit 332 determines in step S902 that no data (including the document data and the face image data) temporarily stored in the memory unit 335 exists (NO in step S902), the processing advances to step S904.

In steps S904 through S908, the CPU of the image forming apparatus 130b performs the processing that is similar to the processing in steps S702 through S706 illustrated in FIG. 7.

More specifically, in step S904, the I/O control unit 333 controls the imaging apparatus 142 to capture the face image of the user. When the control unit 332 determines in step S905 that the captured face image is a recognizable image, the processing advances to step S906.

In step S906, the CPU of the image forming apparatus 130b sends, to the management server 110, the request for searching for the document data using the face image data via the communication unit 331. Then, the CPU of the image forming apparatus 130b receives the search result of the document data using the face image data from the management server 110.

When the control unit 332 determines in step S907 that one or more document data has been extracted as the result of the search for the document data using the face image data (YES in step S907), the processing advances to step S908.

In step S908, the CPU of the image forming apparatus 130b downloads the extracted document data and the face image data from the management server 110. Then in step S903, the control unit 332 displays a list of the downloaded face image data.

On the other hand, when the control unit 332 determines in step S907 that no document data has been extracted as the result of the search of the document data using the face image data (NO in step S907), the processing advances to step S909.

In step S909, the CPU of the image forming apparatus 130b displays a message indicating that no document data exists on the pull printing screen. Then, the processing ends.

Then, the user selects his/her face image data from the list of the face image data displayed on the pull printing screen illustrated in FIG. 10B and presses the print key 1020 to issue the request for printing.

Figure 11:
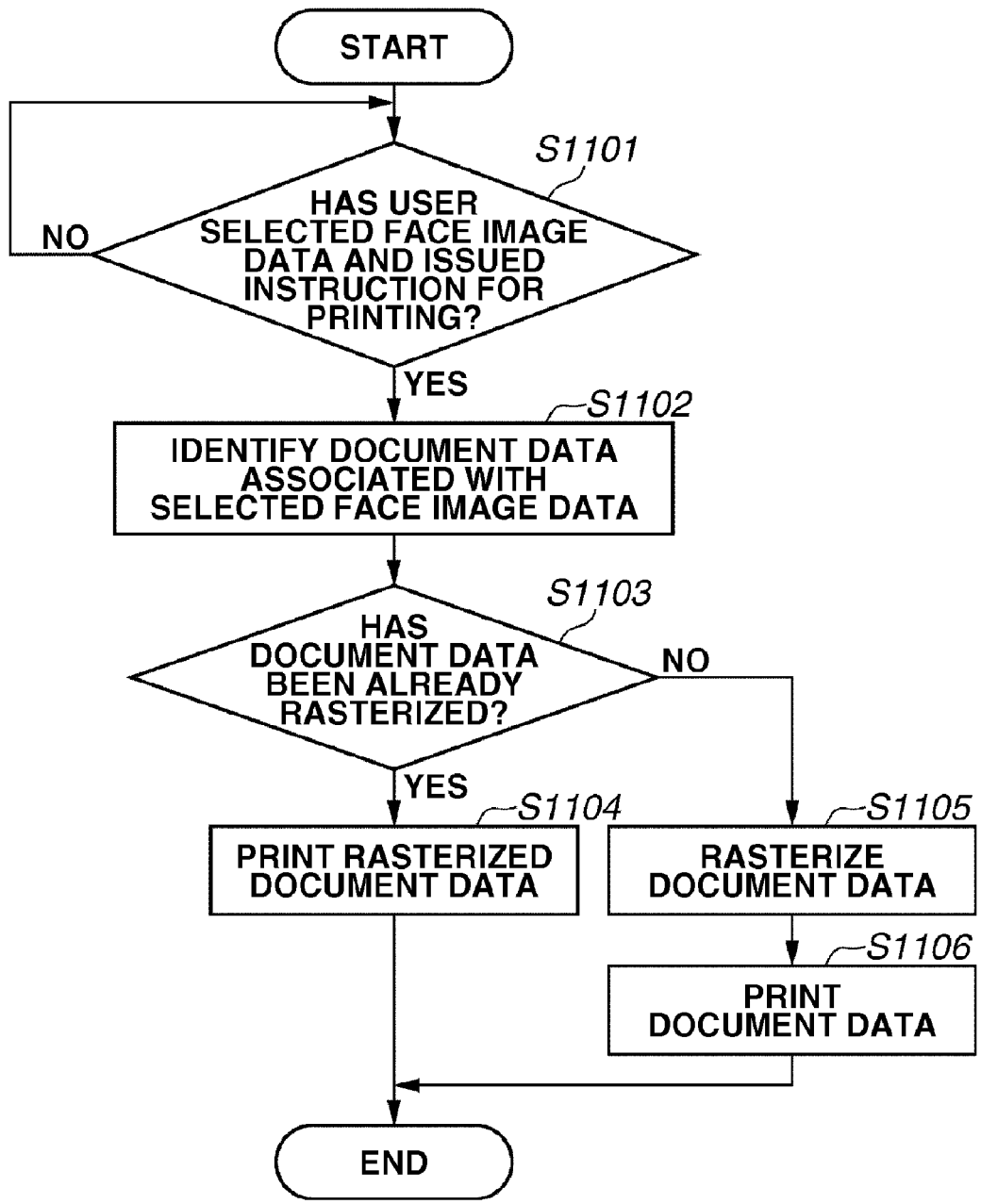
FIG. 11 is a flowchart illustrating an example of data processing performed by the image forming apparatus according to an exemplary embodiment of the present invention.

FIG. 11 is a flowchart illustrating an example of data processing performed by the image forming apparatus according to the present exemplary embodiment. The example illustrated in FIG. 11 describes the processing for performing pull printing of the document data downloaded from the management server 110 which is performed when the user issues the request for printing via the operation panel.

Each step is implemented by the CPU of the image forming apparatus 130b that loads the control program (including the processing module) stored in the HDD 209, the FD 213, or the ROM 203 on the RAM 202 and executes the control program.

Referring to FIG. 11, in step S1101, the control unit 332 determines whether the user has selected face image data and issued the request for printing via the screen illustrated in FIG. 10B. When the control unit 332 determines in step S1101 that the user has selected face image data and issued the request for printing (YES in step S1101), the processing advances to step S1102.

In step S1102, the control unit 332 identifies the document data associated with the face image data which is selected by the user.

In step S1103, the control unit 332 determines whether the document data identified in step S1102 has been rasterized into printable data. When the control unit 332 determines in step S1103 that the document data identified in step S1102 has been rasterized into printable data (YES in step S1103), the processing advances to step S1104.

In step S1104, the printing unit 336 performs printing using the rasterized document data. Then, the processing ends.

On the other hand, when the control unit 332 determines in step S1103 that the document data identified in step S1103 has not been rasterized yet (NO in step S1103), the processing advances to step S1105. In step S1105, the processing unit 334 rasterizes the document data to convert a format of the document data into a printable data format.

In step S1106, the printing unit 336 prints the rasterized document data with the processing unit 334. Then, the processing ends.

As described above, according to the present exemplary embodiment, the inexpensive and efficiently operable pull printing system can be achieved by utilizing an imaging apparatus such as a conventional web camera or a monitoring camera. In addition, the above-described pull printing system can reduce wait time of the user from instructing the start of pull printing at the image forming apparatus to completion of the printing.

In the present exemplary embodiment, the face image data is used when the user selects the document data to be printed. However, a general method in which document names are displayed as a list can be used instead of the face image data.

In that case, the present exemplary embodiment can be implemented by sending data such as a document name to the management server 110 together with the document data at the time of requesting the registration of the document data to manage the document name as well as the document data in the document data portion 316.

Second Exemplary Embodiment

A second exemplary embodiment is different from the first exemplary embodiment in only a point that the user is required to enter the password in registering and printing the document data. Accordingly, only the difference point is described in the following.

Figure 12:
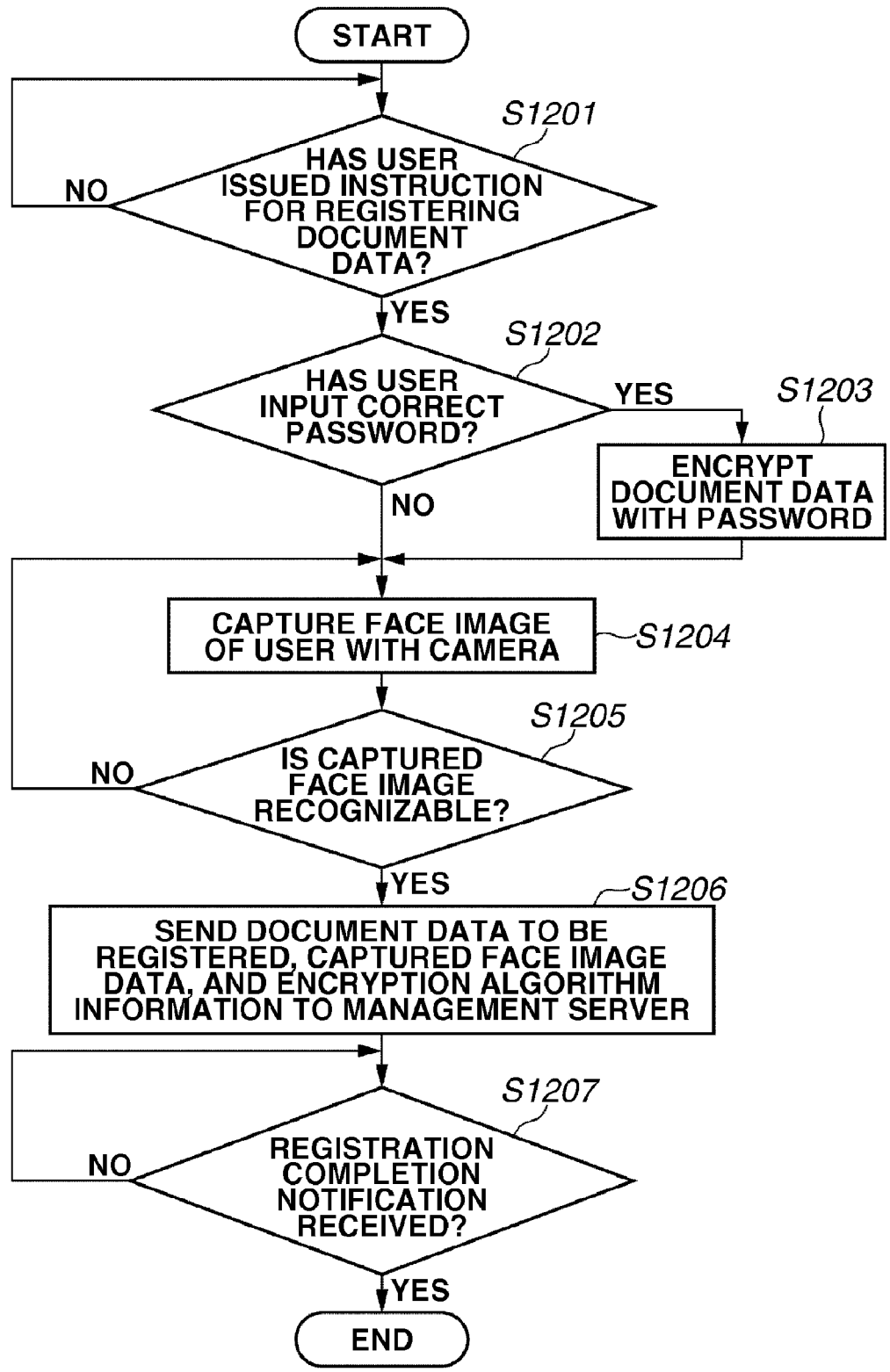
FIG. 12 is a flowchart illustrating an example of data processing performed by the information processing apparatus according to an exemplary embodiment of the present invention.

FIG. 12 is a flowchart illustrating an example of data processing performed by the information processing apparatus according to the present exemplary embodiment. The example illustrated in FIG. 12 describes the processing for causing the user to enter the password (the user identification information) and sending the data after encryption thereof, which is performed when the user operates the client PC 120a to issue the request for printing document data.

Each step is implemented by the CPU of the client PC 120a that loads the control program (including the processing module) stored in the HDD 209, the FD 213, or the ROM 203 on the RAM 202 and executes the control program.

In the example of the processing illustrated in FIG. 12, the processing for determining whether the password has been correctly entered, which is performed in step S1202, and encryption processing performed in step S1203 are added to the processing performed according to the flowchart of FIG. 4 described in the first exemplary embodiment. Further, in the example of the processing illustrated in FIG. 12, the encryption algorithm information is added to data to be sent in step S1206.

Referring to FIG. 12, in step S1201, the control unit 324 determines whether an instruction for printing and registering the document data has been issued by the user. When the processing unit 334 determines in step S1201 that the instruction for printing and registering the document data has been received from the user (YES in step S1201), the processing advances to step S1202.

In step S1202, the control unit 324 determines whether the password has been entered. If it is determined in step S1202 that the password has not been correctly entered (NO in step S1202), then the processing advances to step S1204. In step S1204, the CPU of the image forming apparatus 130b performs processing similar to that in the first exemplary embodiment.

On the other hand, when the control unit 324 determines in step S1202 that the password has been correctly entered (YES in step S1202), the processing advances to step S1203.

In step S1203, the control unit 324 encrypts the document data which is requested to be printed by using the entered password as a key.

In the processing in step S1204 and subsequent steps, the encrypted document data is handled as the document data. In steps S1204 and S1205, processing similar to that in steps S402 and S403 illustrated in FIG. 4 is performed.

In a case where encryption of the document data is performed in step S1206, the CPU of the image forming apparatus 130b sends a request for registering information about the encryption algorithm used in the encryption processing to the management server 110 together with the document data and the face image data.

On the other hand, when the management server 110 receives a registration request according to the processing in step S1206 from the client PC 120a, then CPU of the client PC 120a adds and stores the information about the encryption algorithm in a data table stored in the document data portion 316. Then, in step S1207, the processing ends when the client PC 120a receives the registration completion notification from the management server 110 (YES in step S1207).

FIG. 13 illustrates an example of document data stored in the document data portion 316 illustrated in FIG. 3.

As illustrated in FIG. 13, when the document data has been encrypted, the information about the encryption algorithm is added to and stored together with the information managed in the document data portion 316 illustrated in FIG. 6 in the first exemplary embodiment.

Now, the processing performed by the image forming apparatus 130b and the imaging apparatus 142 in the second exemplary embodiment is described.

Figure 14:
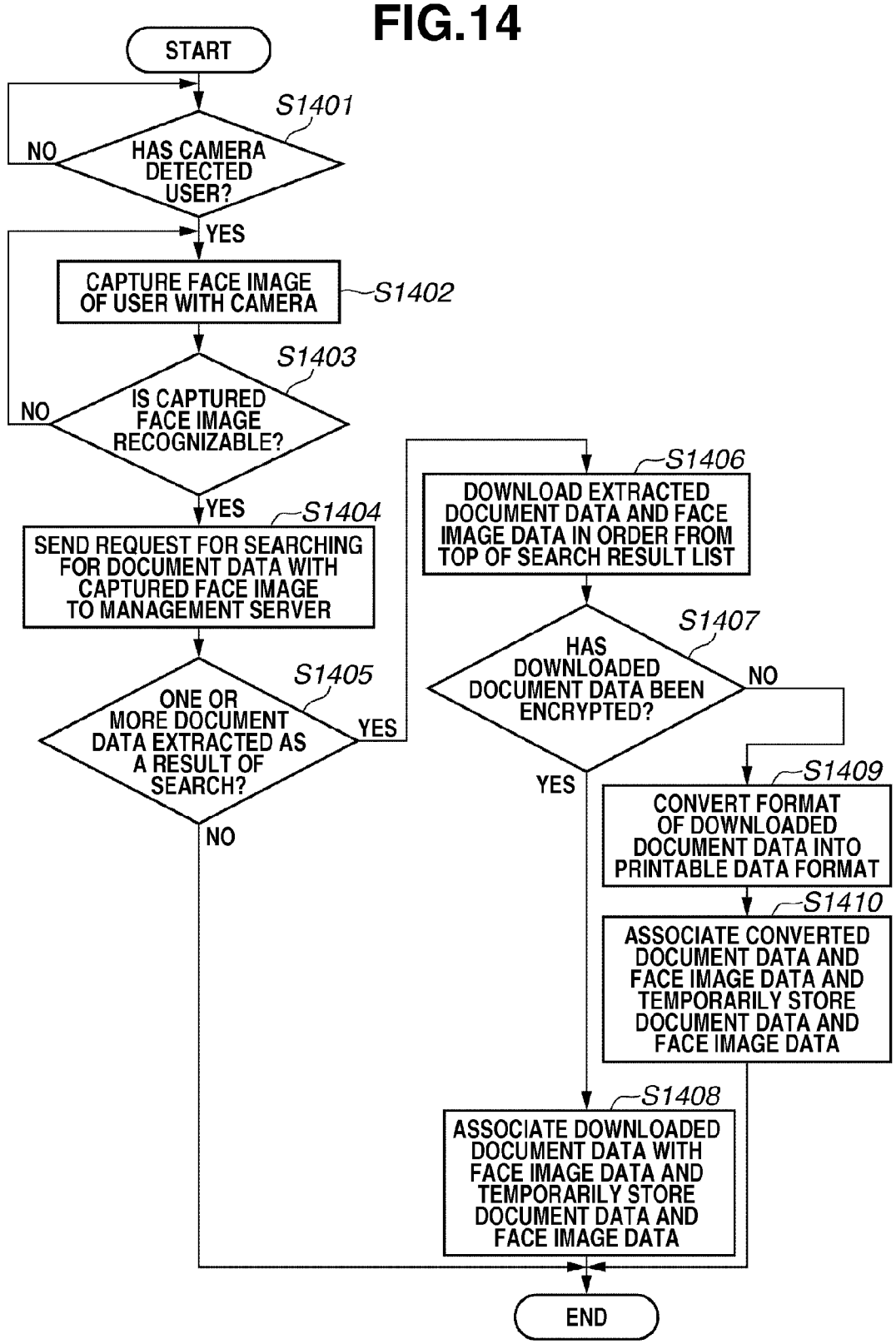
FIG. 14 is a flowchart illustrating an example of data processing performed by the image forming apparatus according to an exemplary embodiment of the present invention.

FIG. 14 is a flowchart illustrating an example of data processing performed by the image forming apparatus according to the present exemplary embodiment. The example illustrated in FIG. 14 describes the processing for performing pull printing on the document data downloaded from the management server 110 when the user has issued the request for printing via the operation panel.

Each step is implemented by the CPU of the image forming apparatus 130b that loads the control program (including the processing module) stored in the HDD 209, the FD 213, or the ROM 203 on the RAM 202 and executes the control program. In the following, processing different from that in the first exemplary embodiment is described.

The processing illustrated in the flowchart of FIG. 14 differs from the processing illustrated in FIG. 7 in the first exemplary embodiment in the points that the processing for determining whether the document data has been encrypted is performed in step S1407 and the processing for temporarily storing the encrypted document data and the face image data by associating each other is performed in step S1408. That is, the present exemplary embodiment handles the encrypted document data and can reduce the time required for downloading the document data with the image forming apparatus 130b.

Similar to the processing in the first exemplary embodiment, when the recognizable face image data of the user is received, the CPU of the image forming apparatus 130b sends the request for searching for the document data to the management server 110.

Then, when the control unit 332 determines in step S1405 that one or more document data has been extracted (YES in step S1405) as the search result, the processing advances to step S1406. In step S1406, the CPU of the image forming apparatus 130b downloads information about the extracted document data and information about the face image data in order from the top of the list of the search result and temporarily stores the downloaded data and information in the memory unit 335.

In step S1407, the control unit 332 determines whether the document data has been encrypted according to the downloaded document data information. When the control unit 332 determines in step S1407 that the document data has not been encrypted, the processing advances to step S1409 and subsequent steps (S1410) to perform the processing similar to that in the first exemplary embodiment (the processing in steps S707 and S708 in FIG. 7).

On the other hand, when the control unit 332 determines in step S1407 that the document data has been encrypted (YES in step S1407), then the CPU of the image forming apparatus 130b advances the processing to step S1408 without performing the rasterization processing for converting the format of the document data into the printable format. In step S1408, the CPU of the image forming apparatus 130b associates the encrypted image data with the face image data and temporarily stores the mutually associated data in the memory unit 335. Then, the processing ends.

Figure 15:
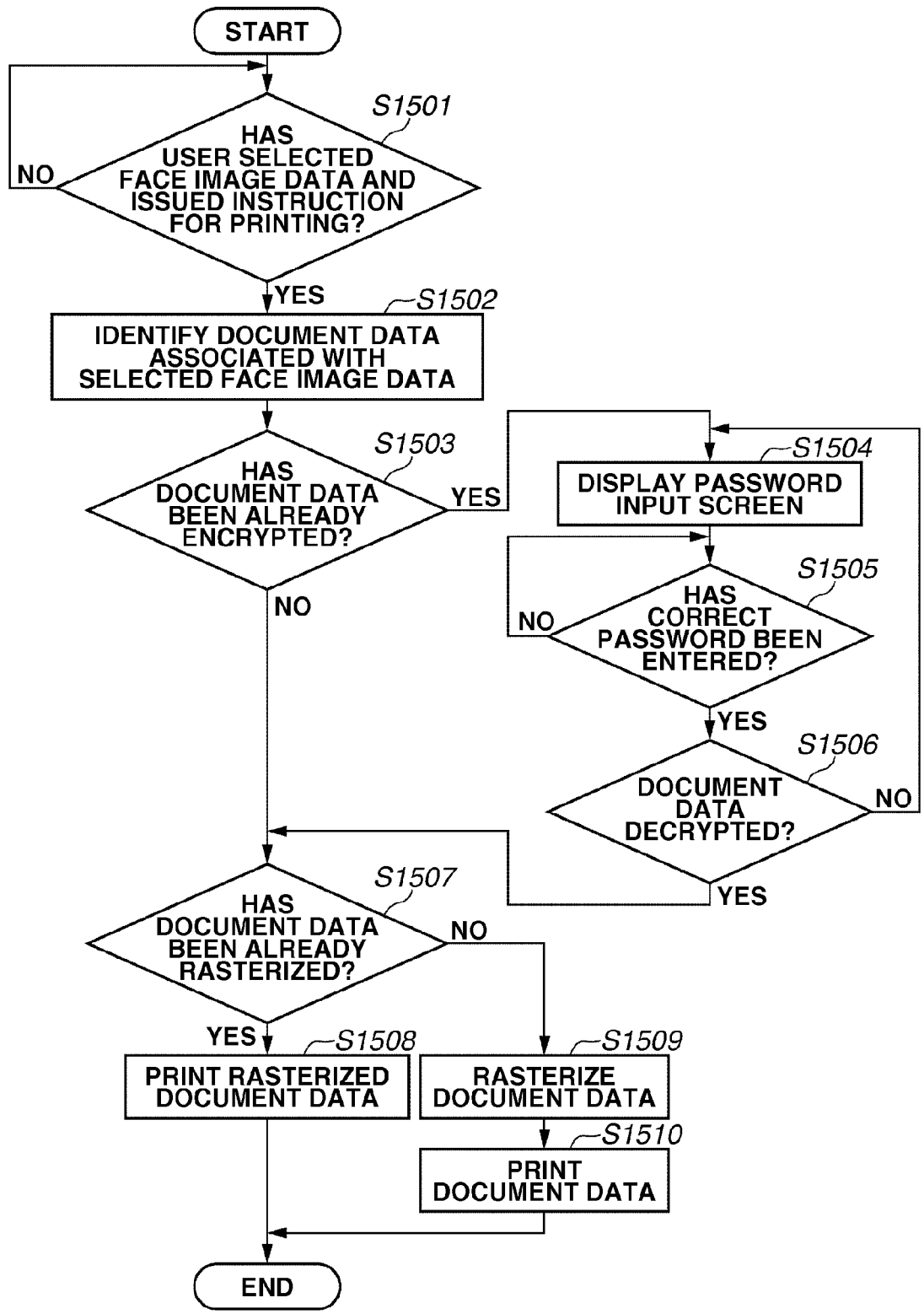
FIG. 15 is a flowchart illustrating an example of data processing performed by the image forming apparatus according to an exemplary embodiment of the present invention.

FIG. 15 is a flowchart illustrating an example of data processing performed by the image forming apparatus according to the present exemplary embodiment. The example illustrated in FIG. 15 describes the processing which is performed when the user selects his/her face image data from the list of the face image data displayed on the pull printing screen and presses the print key 1020 to issue the request for printing.

Each step is implemented by the CPU of the image forming apparatus 130b that loads the control program (including the processing module) stored in the HDD 209, the FD 213, or the ROM 203 on the RAM 202 and executes the control program.

In the present exemplary embodiment, the processing for determining whether the document data has been encrypted and the processing for displaying a password input screen and decrypting the encrypted document data are added to the processing described with reference to FIG. 11 in the first exemplary embodiment.

Referring to FIG. 15, similar to the first exemplary embodiment, in step S1501, the user selects his/her face image data via the pull printing screen and issues the request for printing. Then in step S1502, the control unit 332 identifies the document data associated with the selected face image data. In step S1503, the control unit 332 determines whether the identified document data has been encrypted.

When the control unit 332 determines in step S1503 that the identified document data has not been encrypted (NO in step S1503), the processing advances to step S1507.

On the other hand, when the control unit 332 determines in step S1503 that the document data has been encrypted (YES in step S1503), the processing advances to step S1504.

Figure 16:
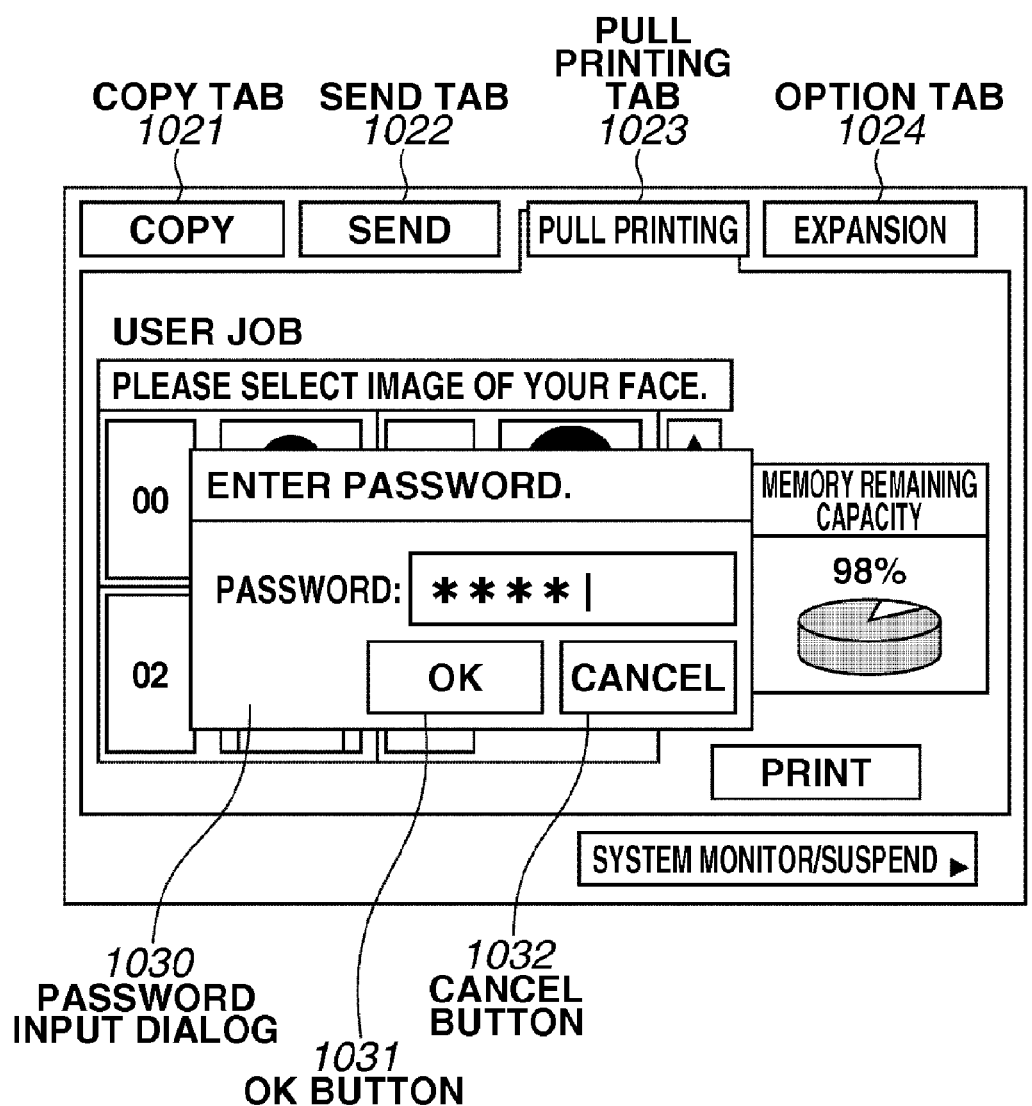
FIG. 16 illustrates an example of a user interface displayed on a touch panel of the image forming apparatus illustrated in FIG. 3.

In step S1504, the CPU of the image forming apparatus 130b displays a password input dialog 1030 illustrated in FIG. 16 on the pull printing screen of the touch panel unit 1001.

FIG. 16 illustrates an example of the user interface displayed on the touch panel of the image forming apparatus illustrated in FIG. 3. More specifically, in FIG. 16, the pull printing operation screen is illustrated.

The user operates a key on the operation panel to enter the password in the password input dialog 1030. Then, the user presses an OK button 1031 or a cancel button 1032.

In step S1505, the control unit 332 determines whether the user has entered the password and pressed the OK button 1031. When the control unit 332 determines in step S1505 that the user has pressed the OK button 1031 (YES in step S1505), the processing advances to step S1506.

In step S1506, the processing unit 334 decrypts the encrypted document data using the entered password. Further, the processing unit 334 determines whether the document data decryption processing has been successfully completed. When the processing unit 334 determines in step S1506 that the document data decryption processing has been completed (YES in step S1506), the processing advances to step S1507.

In step S1507, the processing unit 334 determines whether the document data acquired from the management server 110 is the rasterized document data that can be printed by the printing unit 336.

When the processing unit 334 determines in step S1507 that the document data has not been rasterized (NO in step S1507), the processing advances to step S1509.

In step S1509, the processing unit 334 rasterizes the document data to convert the format of the document data into a printable data format in the printing unit 336.

In step S1510, the printing unit 336 prints the rasterized printable data. Then, the processing ends.

Further, when the processing unit 334 determines in step S1507 that the document data has been rasterized (YES in step S1507), then the printing unit 336 prints the rasterized data in step S1508. Then, the processing ends.

On the other hand, when the processing unit 334 determines in step S1506 that the document data decryption processing has not been successfully completed (NO in step S1506), then the processing returns to step S1504. In step S1504, the CPU of the image forming apparatus 130b prompts the user to enter a correct password.

In addition, if it is determined in step S1506 that the user has pressed the cancel button 1032 on the screen illustrated in FIG. 16, the control unit 332 stops the print processing. Then, the processing ends.

As described above, the second exemplary embodiment is different from the first exemplary embodiment in the point that the user uses the password to encrypt the document data. Accordingly, it can prevent a person other than the authentic user from printing the document data.

In the present exemplary embodiment, the data to be encrypted using the password is the print target document data itself. However, any data other than the face image data can be encrypted.

For example, in a case where a document name of the document data, instead of the document data itself, is used as the data to be encrypted, the document data itself is not encrypted, of course, as described above in the present exemplary embodiment. Accordingly, the processing for converting the format of the document data into the printable format can be performed immediately after downloading the document data, similar to the first exemplary embodiment.

In this case, if the data to be encrypted such as the document name is added to the information managed in the document data portion 316, the present exemplary embodiment can be implemented using the document name as the data to be encrypted or decrypted instead of the document data itself.

Further, in a case where information or data other than the document data is used as the data to be encrypted or decrypted, it can prevent a person other than the authenticated user from printing the document data. In addition to the above-described effect, when the document data is encrypted, it can prevent a person other than the authenticated user from viewing the document data at the time of requesting the registration or downloading of the document data even if the communication path has not been encrypted.

In the first exemplary embodiment, when it is detected that the user has approached the image forming apparatus, the face image of the user is captured. The captured face image data of the user is sent to the management server to search for data approximate to the characteristic amount of the face image.

If it is determined that the data approximate to the characteristic amount previously registered in the management server exists, then the document data associated with the characteristic amount data is sent to the image forming apparatus. The user performs printing of the document data by selecting the face image of the user displayed on the display unit of the image forming apparatus.

That is, in the first exemplary embodiment, the printing of the document data can be started immediately after the determination of the characteristic amount of the face image of the user. However, in the first exemplary embodiment, the user may accidentally print another person's document data when the user's face image substantially resembles another person's face image. Further, the user may select a face image of other person who resembles the user by mistake at the time of selecting his/her face image from the face image list (FIG. 10B). As a result, the user may print the document data for the other person.

In order to prevent these occasions, in the second exemplary embodiment, the user selects his/her face image and is subjected to user authentication by entering the password at the time of printing the document data with the image forming apparatus. Accordingly, although the wait time for completion of the printing may be longer than the first exemplary embodiment, the wait time can be sufficiently reduced compared to the above-described conventional method in which the document data is acquired from the management server after authenticating the user with the password.

Third Exemplary Embodiment

A third exemplary embodiment is different from the first and the second exemplary embodiments in a point that the timing for entering the password is set before displaying the list on the pull printing screen. Accordingly, only the point different from the first and the second exemplary embodiments is described.

Figure 17:
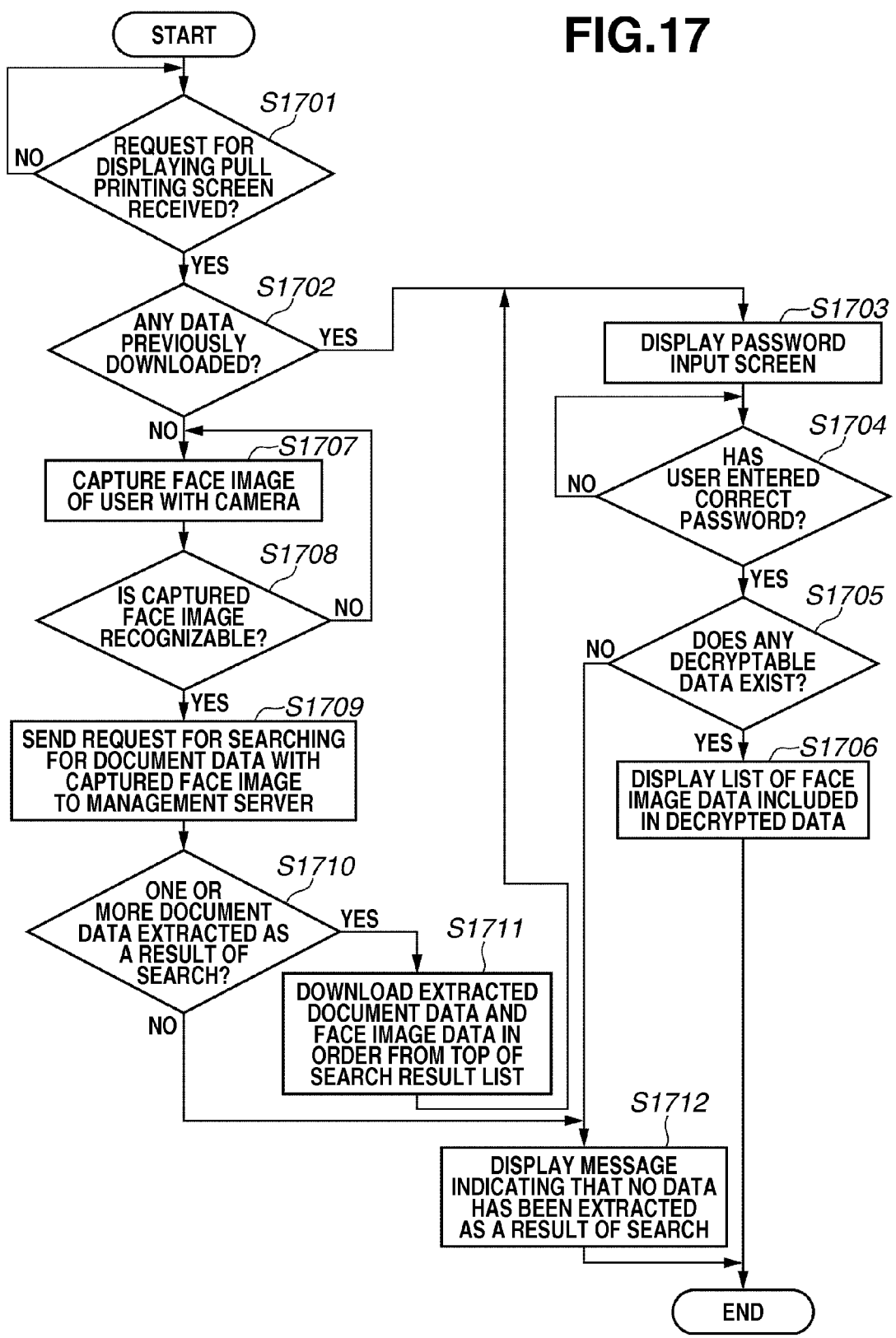
FIG. 17 is a flowchart illustrating an example of data processing performed by the image forming apparatus according to an exemplary embodiment of the present invention.

FIG. 17 is a flowchart illustrating an example of data processing performed by the image forming apparatus according to the present exemplary embodiment. The example illustrated in FIG. 17 is a case where the user operates the touch panel unit 1001 of the image forming apparatus 130b to select the pull printing tab 1023.

Each step is implemented by the CPU of the image forming apparatus 130b that loads the control program (including the processing module) stored in the HDD 209, the FD 213, or the ROM 203 on the RAM 202 and executes the control program.

The example illustrated in FIG. 17 is different from the processing illustrated in FIG. 9 described in the first exemplary embodiment in a point that only a list of the data that has been decrypted with the password entered by the user on a password input screen is displayed before generating information about the list to be displayed.

It is also useful if the touch panel unit 1001 is displayed to perform the user authentication before performing processing in step S1702 to restrict the pull printing instructed by the user who has not been successfully authenticated.

Referring to FIG. 17, similar to the first exemplary embodiment, in step S1701, the control unit 332 determines whether the request for displaying the pull printing screen has been issued by the user. If it is determined in step S1701 that the request for displaying the pull printing screen has been issued by the user (YES in step S1701), then the processing advances to step S1702. In step S1702, the control unit 332 determines whether data previously downloaded from the management server 110 exists. When the control unit 332 determines in step S1702 that no data that has been previously downloaded from the management server 110 exists (NO in step S1702), the processing advances to step S1707.

In step S1707, the processing similar to that in steps S904 through S908 described in the first exemplary embodiment is performed and the processing advances to step S1708.

On the other hand, if it is determined in step S1702 that data that has been previously downloaded exists (YES in step S1702), then the processing advances to step S1703.

Figure 18:
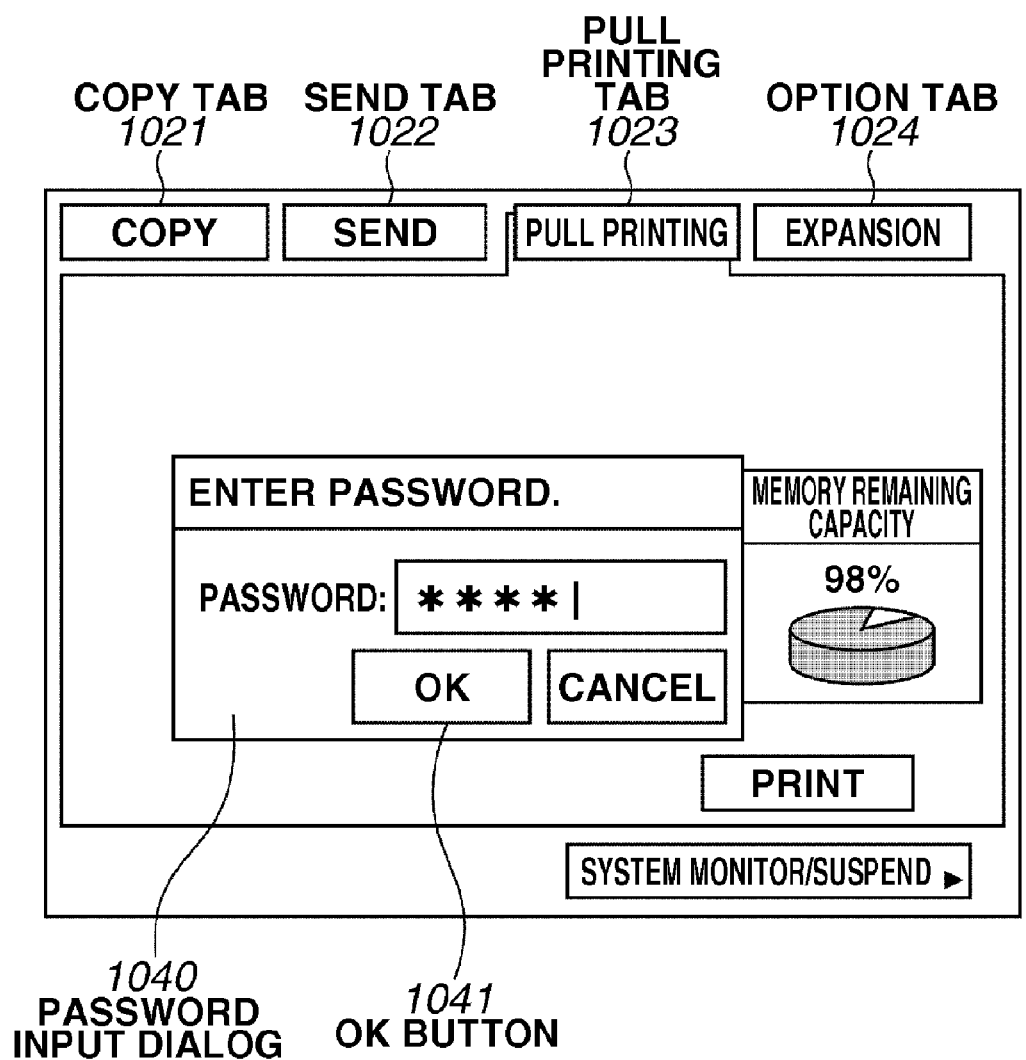
FIG. 18 illustrates an example of a user interface displayed on a touch panel of the image forming apparatus illustrated in FIG. 3.

In step S1703, the control unit 332 displays a password input dialog 1040 illustrated in FIG. 18 on the screen of the touch panel unit 1001.

FIG. 18 illustrates an example of the user interface displayed on the touch panel of the image forming apparatus illustrated in FIG. 3. More specifically, in FIG. 18, the pull printing operation screen is illustrated.

In step S1704, the control unit 332 determines whether the user has entered the correct password and pressed the OK button 1041. When the control unit 332 determines in step S1704 that the user has pressed the OK button 1041 (YES in step S1704), then the processing advances to step S1705.

In step S1705, the processing unit 334 uses the input password as a key to decrypt the previously downloaded document data.

Then, the control unit 332 determines whether one or more data which can be decrypted by the processing unit 334 exists. When the control unit 332 determines in step S1705 that one or more data which can be decrypted by the processing unit 334 exists (YES in step S1705), then the processing advances to step S1706.

On the other hand, when the control unit 332 determines in step S1705 that no data can be decrypted (NO in step S1705), then the processing advances to step S1712.

In step S1706, the control unit 332 displays a list of the face image data corresponding to the data decrypted in step S1705 on the pull printing screen. Then, the processing ends.

On the other hand, in step S1712, the control unit 332 displays a message indicating that no data to be displayed in a list exists on the pull printing screen. Then, the processing ends.

As discussed above, according to the present exemplary embodiment, the list of the face image data is not displayed unless the user enters a correct password, differently from the first and the second exemplary embodiments. Accordingly, existence of the document data that the user has requested to display can be kept secret from other persons.

Therefore, the present exemplary embodiment can prevent other persons from knowing that the user has issued the request for printing the document data. In addition, the present exemplary embodiment can also prevent a person other than the authentic user from instructing the printing of the requested document data by mistake.

In the second exemplary embodiment, the face image data is not a target of the encryption. However, in the present exemplary embodiment, any data can be used as the target of the encryption including the face image data.

Fourth Exemplary Embodiment

A fourth exemplary embodiment is different from the first, the second, and the third exemplary embodiments in a point that when a plurality of document data is to be downloaded, only the document data around the top of the list whose characteristic amount is approximate to one another is acquired and only the face image data is acquired as the other document data. Only the point different from the above-described embodiments is described in the following.

In the present exemplary embodiment, as one example, only one document data whose face image has a characteristic amount most similar to the face image registered in the management server 110 is downloaded for convenience of explanation. However, the present invention is not limited to one document data. That is, in the present exemplary embodiment, it is also useful if a specific number of document data is downloaded in order from those at the top of the list.

Figure 19:
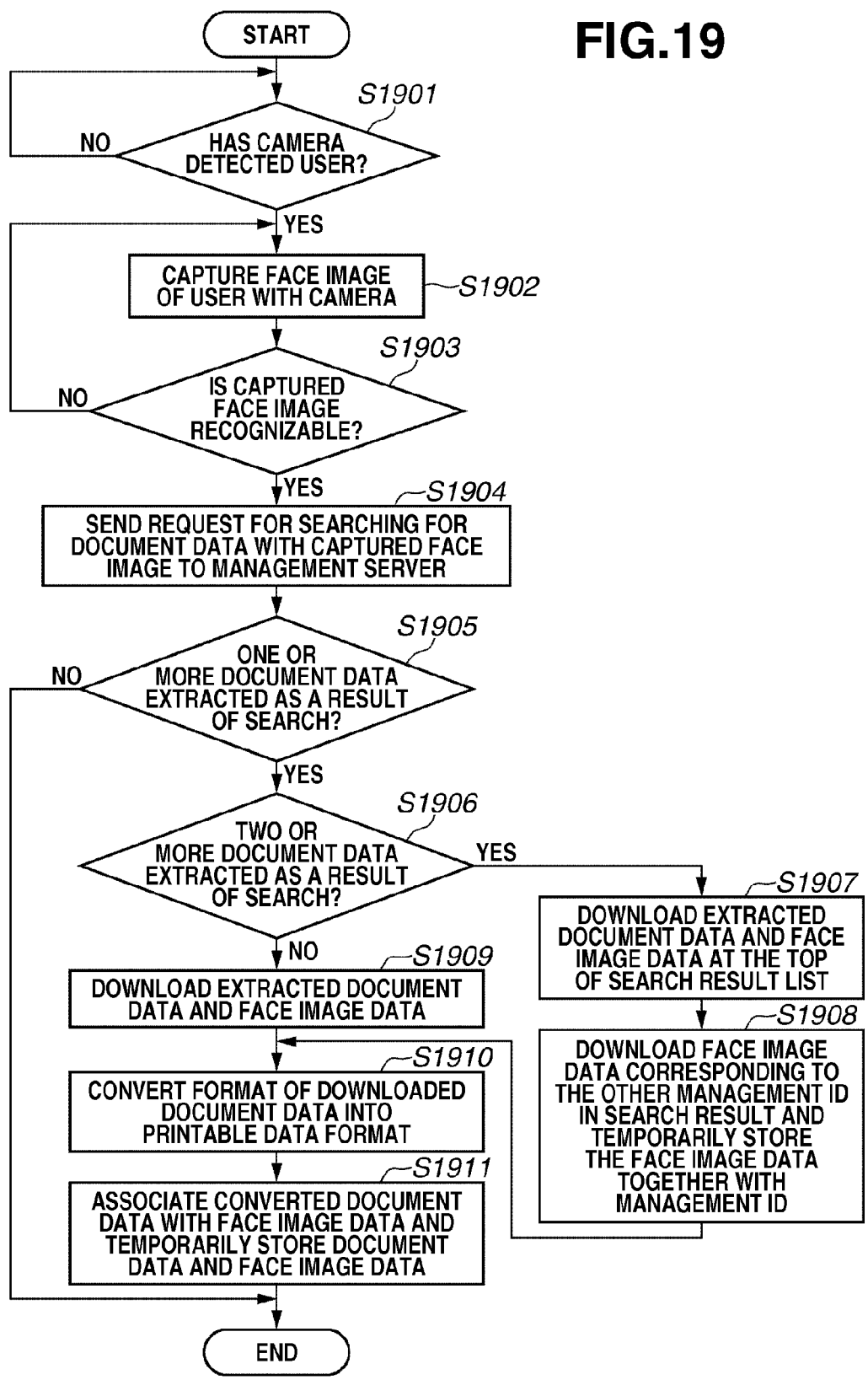
FIG. 19 is a flowchart illustrating an example of data processing performed by the image forming apparatus according to an exemplary embodiment of the present invention.

FIG. 19 is a flowchart illustrating an example of data processing performed by the image forming apparatus according to the present exemplary embodiment. The example illustrated in FIG. 19 describes the processing performed by the image forming apparatus 130b and the imaging apparatus 142 when the user has approached the image forming apparatus 130b.

Each step is implemented by the CPU of the image forming apparatus 130b that loads the control program (including the processing module) stored in the HDD 209, the FD 213, or the ROM 203 on the RAM 202 and executes the control program.

The processing illustrated in FIG. 19 is different from that illustrated in FIG. 7 of the first exemplary embodiment and that illustrated in FIG. 14 of the second exemplary embodiment only with respect to the processing for downloading the document data and the face image data according to the search result.

The control unit 332 performs processing from steps S1901 through S1905 in the same way as that in the above-described exemplary embodiments. In step S1906, the control unit 332 determines whether two or more document data have been extracted as the search result.

When the control unit 332 determines in step S1906 that only one document data has been extracted as the search result (NO in step S1906), the processing advances to step S1909. In step S1909, the control unit 332 downloads the document data and the face image data similar to the above-described exemplary embodiments. Then, the processing advances to step S1910.

On the other hand, when the control unit 332 determines in step S1906 that two or more document data has been extracted as the search result (YES in step S1906), the processing advances to step S1907. In step S1907, the control unit 332 downloads the document data and the face image data for one management ID that has been determined to have a characteristic amount most approximate to the characteristic amount registered in the management server 110 and listed at the top in the search result, among the management IDs displayed in the list from the management server 110.

In step S1908, the control unit 332 downloads the face image data for the other management IDs in the search result but does not download the document data.

Then, the control unit 332 temporarily stores the face image data downloaded from the management server 110 in the memory unit 335 together with the management ID.

In step S1910, the processing unit 334 converts the data format of the document data downloaded in step S1907 or step S1909 into a printable data format in the printing unit 336.

In step S1911, the data converted into the printable data format in the printing unit 336 and the face image data are associated with each other and temporarily stored in the memory unit 335. Then, the processing ends.

Figure 20:
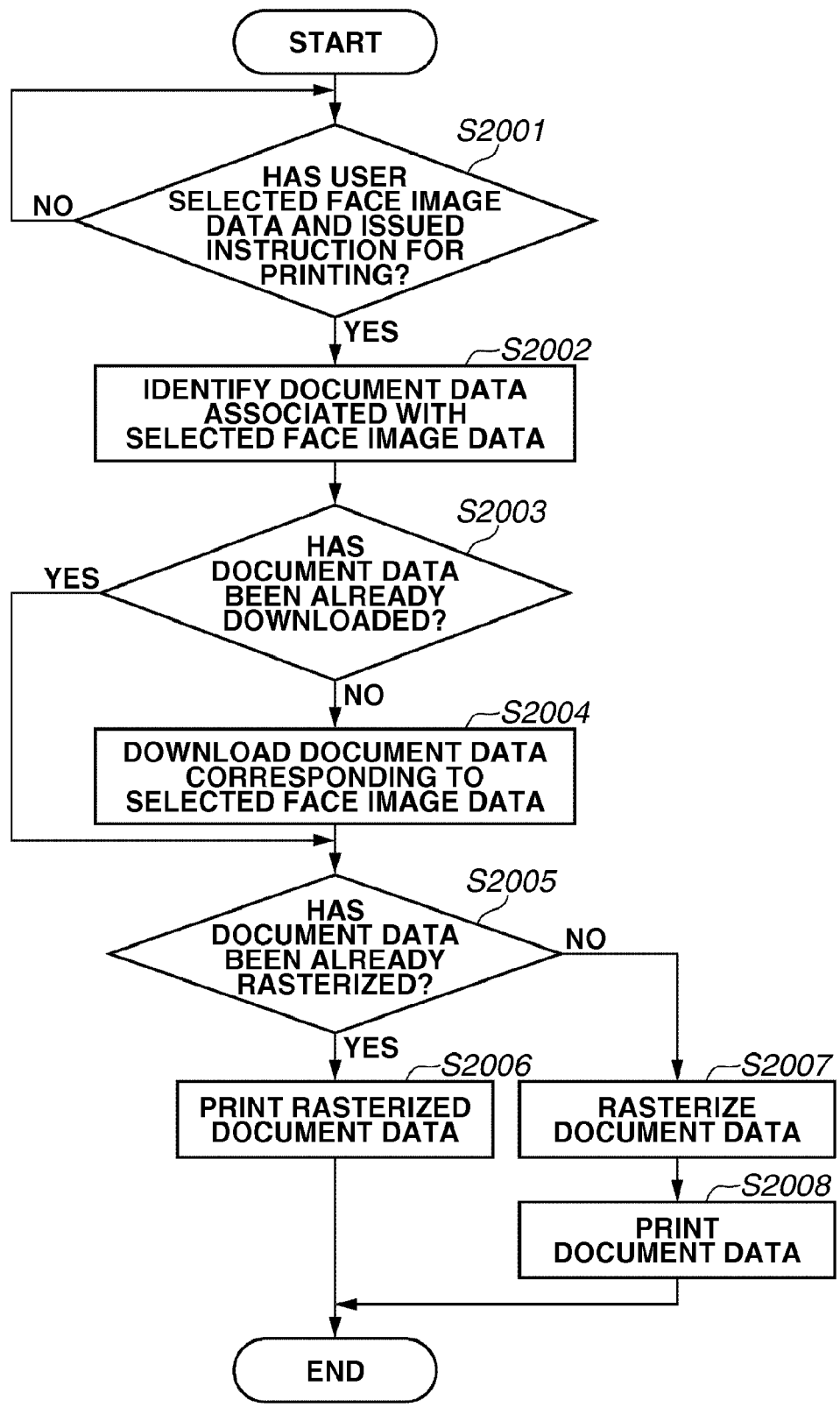
FIG. 20 is a flowchart illustrating an example of data processing performed by the image forming apparatus according to an exemplary embodiment of the present invention.

FIG. 20 is a flowchart illustrating an example of data processing performed by the image forming apparatus according to the present exemplary embodiment. The example illustrated in FIG. 20 describes the processing which is performed when the user selects his/her face image from the list of the face image data displayed on the pull printing screen and presses the print key 1020 to issue the request for printing.

Each step is implemented by the CPU of the image forming apparatus 130*b* that loads the control program (including the processing module) stored in the HDD 209, the FD 213, or the ROM 203 on the RAM 202 and executes the control program.

The processing illustrated in FIG. 20 is different from those in the above-described exemplary embodiments in a point that the processing for determining whether the document data associated with the face image data that has been instructed to be printed by the user has already been downloaded and the processing for downloading the document data when the document data has not been downloaded yet are added.

Referring to FIG. 20, in step S2001, the control unit 332 determines whether the user has issued a print request via the touch panel unit 1001. When the control unit 332 determines in step S2001 that the user has issued the print request via the touch panel unit 1001 (YES in step S2001), the processing advances to step S2002.

In step S2002, the control unit 332 identifies the document data associated with the face image data received according to the print request.

In step S2003, the control unit 332 determines whether the associated document data has already been downloaded. When the control unit 332 determines in step S2003 that the associated document data has already been downloaded (YES in step S2003), the processing advances to step S2005.

When the control unit 332 determines in step S2003 that the associated document data has already been downloaded (YES in step S2003), then the CPU of the image forming apparatus 130*b*, similar to the processing in the above-described exemplary embodiments, determines whether the document data has been rasterized. Then, the CPU of the image forming apparatus 130*b* rasterizes the document data as necessary and prints the rasterized data. Then, the processing ends.

On the other hand, when the control unit 332 determines in step S2003 that the associated document data has not been downloaded yet (NO in step S2003), the processing advances to step S2004. In step S2004, the control unit 332 uses the management ID for the selected face image data and sends a request for downloading the document data corresponding to the management ID to the management server 110 and downloads the document data.

When the document data is completely downloaded by the control unit 332 from the management server 110, the processing advances to step S2005.

In step S2005, the control unit 332 determines whether the downloaded document data has been rasterized. When the control unit 332 determines in step S2005 that the downloaded document data has not been rasterized yet (NO in step S2005), the processing advances to step S2007.

In step S2007, the CPU of the image forming apparatus 130*b* performs the rasterization processing for converting the format of the downloaded document data into a printable data format, as necessary.

In step S2008, the CPU of the image forming apparatus 130*b* prints the rasterized data. Then, the processing ends.

On the other hand, when the control unit 332 determines in step S2005 that the downloaded document data has already been rasterized (YES in step S2005), then the processing advances to step S2006. In step S2006, the CPU of the image forming apparatus 130*b* prints the rasterized data. Then, the processing ends.

As described above, according to the present exemplary embodiment, a number of times of performing the downloading processing or the rasterization processing when the imaging apparatus 142 detects the user can be reduced compared to the above-described exemplary embodiments.

Therefore, in a case where the number of document data in the search result becomes large because the search for the document data according to the characteristic amount data is not accurate, the present exemplary embodiment can perform control not to download, store, or process a large amount of data whose characteristic amount is not approximate to the characteristic amount of the data registered in the management server 110.

Further, by performing control to prioritize the processing of data whose characteristic amount is more approximate to the characteristic amount of the data stored in the management server 110 depending on the capacity or the performance of the system, the image forming system can improve the efficiency of the processing.

In each of the above-described exemplary embodiments, the physical characteristic amount is calculated by the management apparatus based on the image data of the user captured by the information processing apparatus or the image forming apparatus.

However, the processing load on the management apparatus can also be reduced by calculating the physical characteristic amount of the user while the same image processing is performed on each image data captured with the information processing apparatus or the image forming apparatus, and by sending the calculated characteristic amount to the management apparatus together with the output data.

According to each of the above-described exemplary embodiments, the printing instructed by the user can be efficiently and securely performed by the image forming apparatus designated by the user with a combination of a conventional device and the image forming apparatus without previously sending the output data to a plurality of devices or installing a dedicated device.

Fifth Exemplary Embodiment

The configuration of a data processing program that can be read by the information processing apparatus according to an exemplary embodiment of the present invention is described with reference to memory maps illustrated in FIGS. 21, 22, and 23.

FIG. 21 is a memory map of a storage medium storing various data processing programs that can be read by the information processing apparatus according to an exemplary embodiment of the present invention.

FIG. 22 is a memory map of a storage medium storing various data processing programs that can be read by the management apparatus according to an exemplary embodiment of the present invention.

FIG. 23 is a memory map of a storage medium storing various data processing programs that can be read by the image forming apparatus according to an exemplary embodiment of the present invention.

Although not illustrated, information for managing the programs stored in the storage medium, such as version information and information concerning a creator of the program, can be stored in the storage medium. In addition, information that depends on an OS of an apparatus that reads the program, such as an icon for identifying and displaying the program, can be stored in the storage medium.

Data that is subordinate to the various programs is also managed in a directory of the storage medium. In addition, a program for installing the various programs on a computer can be stored in the storage medium. When a program to be installed is compressed, a program for decompressing the compressed program can be stored in the storage medium.

Functions according to the above-described exemplary embodiments illustrated in FIGS. 4, 5, 7, 8, 9, 11, 12, 14, 15, 17, 19, and 20 can be implemented by a host computer using a program that is externally installed. In this case, the present invention is applied to a case where a group of information including a program is supplied to an output device from a storage medium such as a CD-ROM, a flash memory, and a floppy disk (FD) or from an external storage medium through a network.

As described above, the present invention can be achieved by providing a system or an apparatus with a storage medium which stores program code of software for implementing the functions of the exemplary embodiments and by reading and executing the program code stored in the storage medium with a computer (a CPU or a micro processing unit (MPU)) of the system or the apparatus.

In this case, the program code itself which is read from the storage medium implements the functions of the above described embodiments of the present invention, and the storage medium storing the program code constitutes the present invention.

Accordingly, the program can be configured in any form, such as object code, a program executed by an interpreter, and script data supplied to an OS, as long as it has the function of the program.

As the storage medium for supplying the program, a floppy disk, a hard disk, an optical disk, a magneto-optical disk (MO), a CD-ROM, a compact disk recordable (CD-R), a compact disk rewritable (CD-RW), a magnetic tape, a non-volatile memory card, a ROM, and a digital versatile disk (DVD), a DVD-recordable (DVD-R), a DVD-rewritable (DVD-RW), and the like can be used.

In this case, the program code itself which is read from the storage medium implements the function of the exemplary embodiments described above, and the storage medium storing the program code constitutes the present invention.

The program can be supplied by connecting to a web site on the Internet by using a browser of a client computer and by downloading the program itself or a compressed file that includes an automatic installation function from the web site to a storage medium such as a hard disk. The functions of the above exemplary embodiments can be implemented by dividing the program code into a plurality of files and downloading each divided file from different web sites. That is, a World Wide Web (WWW) server and a file transfer protocol (ftp) server for allowing a plurality of users to download the program file for implementing the functional processing configure the present invention.

The program can be supplied by distributing a storage medium such as a CD-ROM and the like which stores the program according to the present invention after encryption thereof to a user. The user who satisfies a prescribed condition is allowed to download key information for decrypting from the web site via the Internet, so that the present invention is implemented by executing and installing the encrypted program in the computer by using the key information.

The functions according to the exemplary embodiments described above can be implemented not only by executing the program code read by the computer, but also by the processing in which an OS or the like running on the computer carries out a part of or the whole of the actual processing based on an instruction given by the program code.

Further, the functions of the above described embodiments can be implemented by writing the program code read from the storage medium in a memory provided in a function expansion board inserted in a computer or a function expansion unit connected to the computer, and causing a CPU and the like provided in the function expansion board or the function expansion unit to carry out a part of or the whole of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-260051 filed Oct. 3, 2007, which is hereby incorporated by reference herein in its entirety.

What is claimed is:

1. An image forming system comprising an image forming apparatus, a management apparatus, and an information processing apparatus, wherein the information processing apparatus comprises:
 a first imaging unit configured to capture an image of a user who has issued an instruction for downloading output data from the management apparatus and printing the output data; and
 a transfer unit configured to transfer to the management apparatus, image data of the user captured by the first imaging unit and the output data that can be output by the image forming apparatus, wherein the management apparatus comprises:
 a first receiving unit configured to receive the image data and the output data transferred from the information processing apparatus;
 a generation unit configured to generate user characteristic information for identifying the output data from the image data received by the first receiving unit;
 a storage unit configured to store the image data and the output data received by the first receiving unit and the user characteristic information generated by the generation unit in association with one another;
 an acquisition unit configured to acquire, from the image forming apparatus, image data used for searching for the output data stored in the storage unit;
 a creation unit configured to create user characteristic information from the image data acquired by the acquisition unit;

a searching unit configured to search for output data that can be output according to the user characteristic information created by the creation unit and the user characteristic information generated by the generation unit; and a sending unit configured to send the output data extracted as a result of a search by the searching unit and the image data associated with the output data to the image forming apparatus from which the first receiving unit has received the image data, wherein the sending unit sends every item of image data included in the search result and top output data being associated with the user characteristic information generated by the generation unit which is most approximated to the user characteristic information created by the creation unit, but does not send output data other than the top output data, in a case where the search results of the search by the searching unit includes a plurality of items of output data, and wherein the image forming apparatus comprises:

a second imaging unit configured to capture an image of the user who operates the image forming apparatus;

a requesting unit configured to, before the user issues the instruction for downloading the output data from the management apparatus and printing the output data, transfer the image data of the user captured by the second imaging unit to the management apparatus and request the management apparatus to send the output data stored in the management apparatus;

a second receiving unit configured to receive the output data sent from the management apparatus in response to the request by the requesting unit and the image data associated with the output data, wherein the second receiving unit receives every item of image data included in the search results and top output data being associated with the user characteristic information generated by the generation unit which is most approximated to the user characteristic information created by the creation unit, but does not receive output data other than the top output data, in a case where the search result of the search by the searching unit includes a plurality of items of output data;

a converting unit configured to convert the output data received by the second receiving unit before the user issues the instruction for downloading the output data from the management apparatus and printing the output data; and an output unit configured to output the output data in response to the instruction from the user for downloading the output data from the management apparatus and printing the output data, in a case where the output data has been converting by the converting unit.

2. The image forming system according to claim 1, wherein the image forming apparatus further comprises:

a display unit configured to display a plurality of image data received by the second receiving unit, in response to a pull printing tab being selected; and a selection unit configured to select any image data from the plurality of image data displayed by the display unit, wherein the output unit outputs the output data received by the second receiving unit when the user selects image data by operating the selection unit.

3. The image forming system according to claim 2, wherein the image forming apparatus further comprises an authentication unit configured to authenticate the user who has selected the image data according to inputted identification information when the user has selected the image data displayed on the display unit by operating the selection unit, wherein the output unit outputs the output data when the user has been successfully authenticated by the authentication unit.

4. The image forming system according to claim 1, wherein the information processing apparatus further comprises an encryption unit configured to perform encryption processing on the output data according to inputted user identification information, and wherein the transfer unit transfers the image data of the user captured by the first imaging unit and the encrypted output data that can be output by the image forming apparatus to the management apparatus.

5. The image forming system according to claim 1, wherein the image forming apparatus further comprises:

a determination unit configured to determine whether the output data received by the second receiving unit has been encrypted; and a decryption unit configured, when the determination unit determines that the output data has been encrypted, to decrypt the encrypted output data according to the inputted user identification information, wherein the output unit outputs the decrypted output data when the output data has been successfully decrypted by the decryption unit.

* * * * *